(12) United States Patent
Lu et al.

(10) Patent No.: US 11,919,518 B2
(45) Date of Patent: Mar. 5, 2024

(54) VEHICLE LANE CHANGE CONTROL METHOD AND DEVICE

(71) Applicant: GREAT WALL MOTOR COMPANY LIMITED, Hebei (CN)

(72) Inventors: Ning Lu, Hebei (CN); Jian Gao, Hebei (CN); Lin He, Hebei (CN); Jianyong Ge, Hebei (CN); Tianpei Wang, Hebei (CN)

(73) Assignee: GREAT WALL MOTOR COMPANY LIMITED, Hebei (CN)

( * ) Notice: Subject to any disclaimer, the term of this patent is extended or adjusted under 35 U.S.C. 154(b) by 595 days.

(21) Appl. No.: 17/255,215

(22) PCT Filed: Jun. 21, 2019

(86) PCT No.: PCT/CN2019/092238
§ 371 (c)(1),
(2) Date: Dec. 22, 2020

(87) PCT Pub. No.: WO2019/242718
PCT Pub. Date: Dec. 26, 2019

(65) Prior Publication Data
US 2021/0269038 A1 Sep. 2, 2021

(30) Foreign Application Priority Data
Jun. 22, 2018 (CN) .......................... 201810652866.9

(51) Int. Cl.
*B60W 30/18* (2012.01)
*B60W 10/20* (2006.01)
*B60W 40/105* (2012.01)

(52) U.S. Cl.
CPC ...... *B60W 30/18163* (2013.01); *B60W 10/20* (2013.01); *B60W 40/105* (2013.01);
(Continued)

(58) Field of Classification Search
None
See application file for complete search history.

(56) References Cited

U.S. PATENT DOCUMENTS 8,428,843 B2* 4/2013 Lee ...................... B62D 15/025
701/68
9,229,453 B1* 1/2016 Lee ...................... B60W 30/12
(Continued)

FOREIGN PATENT DOCUMENTS

| CN | 102076541 A | 5/2011 |
| CN | 102358287 | 2/2012 |

(Continued)

OTHER PUBLICATIONS

Extended European Search Report (EP App. No. 19822877.7) dated Feb. 22, 2022 (8 pages).
(Continued)

*Primary Examiner* — Jonathan M Dager
(74) *Attorney, Agent, or Firm* — NIXON PEABODY LLP; Jeffrey L. Costellia

(57) ABSTRACT

A method for controlling lane changing of a vehicle, including: receiving a lane changing instruction (step 101); acquiring a speed parameter of the vehicle (step 102); according to the speed parameter, determining a controlling coefficient of a predetermined controller (step 103); acquiring a position-deviation parameter and a heading-angle parameter of the vehicle; if the position-deviation parameter is greater than or equal to a first threshold, or, if the heading-angle parameter is greater than or equal to a second threshold, according to the controlling coefficient, the position-deviation parameter and the heading-angle parameter, determining a target steering-wheel steering angle of the vehicle; and according to the target steering-wheel steering angle, controlling the vehicle to perform a lane changing operation, till the position-deviation parameter is less than the first threshold, and the
(Continued)

heading-angle parameter is less than the second threshold (step 105). The cost of the vehicle lane changing is greatly reduced.

12 Claims, 13 Drawing Sheets

(52) U.S. Cl.
CPC ..... *B60W 2510/20* (2013.01); *B60W 2520/06* (2013.01); *B60W 2554/4041* (2020.02); *B60W 2554/80* (2020.02)

(56) References Cited

U.S. PATENT DOCUMENTS

| | | | |
|---|---|---|---|
| 10,377,383 B2* | 8/2019 | Lei | G08G 1/167 |
| 10,479,363 B2* | 11/2019 | Miyata | B62D 15/0255 |
| 11,117,584 B2* | 9/2021 | D'sa | B60W 60/0011 |
| 11,572,099 B2* | 2/2023 | D'sa | B60W 40/04 |
| 2010/0082195 A1 | 4/2010 | Lee et al. | |
| 2014/0032049 A1* | 1/2014 | Moshchuk | G08G 1/166 701/42 |
| 2014/0309889 A1* | 10/2014 | Kim | B62D 15/0255 701/41 |
| 2015/0120137 A1* | 4/2015 | Zeng | B60R 21/0134 701/41 |
| 2016/0107682 A1* | 4/2016 | Tan | B62D 6/00 701/41 |
| 2016/0185388 A1* | 6/2016 | Sim | B60K 31/0008 701/41 |
| 2018/0186371 A1* | 7/2018 | Sterniak | B62D 5/04 |
| 2018/0357904 A1* | 12/2018 | Miyata | B60W 30/18163 |
| 2019/0071093 A1* | 3/2019 | Ma | B60W 30/18163 |
| 2019/0122557 A1* | 4/2019 | Thapani | B60W 40/10 |
| 2019/0143972 A1* | 5/2019 | Ishioka | B60W 30/162 701/70 |
| 2019/0359202 A1* | 11/2019 | Zhu | B60W 40/04 |
| 2019/0389470 A1* | 12/2019 | Zarringhalam | B62D 6/008 |
| 2020/0108828 A1* | 4/2020 | Yue | B62D 6/008 |
| 2020/0110422 A1* | 4/2020 | Takamatsu | B60W 30/18163 |
| 2020/0180634 A1* | 6/2020 | Hammoud | G05D 1/0088 |
| 2020/0180636 A1* | 6/2020 | Oh | B60W 30/18163 |
| 2020/0377088 A1* | 12/2020 | Fukushige | B60W 40/105 |
| 2021/0206377 A1* | 7/2021 | Mamchuk | G05D 1/0212 |
| 2021/0269056 A1* | 9/2021 | Zhu | B60W 60/0011 |
| 2022/0169281 A1* | 6/2022 | Lin | G06V 20/588 |
| 2022/0219692 A1* | 7/2022 | Taniguchi | B62D 15/0255 |

FOREIGN PATENT DOCUMENTS

| | | |
|---|---|---|
| CN | 102358287 A | 2/2012 |
| CN | 103809593 A | 5/2014 |
| CN | 104097637 A | 10/2014 |
| CN | 104360687 A | 2/2015 |
| CN | 105752081 A | 7/2016 |
| CN | 106080941 A | 11/2016 |
| CN | 107323450 A | 11/2017 |

OTHER PUBLICATIONS

ISR for PCT/CN2019/092238 mailed Sep. 26, 2019, 4 pages.
CN Office Action for CN201810652866.9 dated Feb. 3, 2020, 4 pages.
CN Search Report for CN201810652866.9 dated Jan. 16, 2020, 3 pages.

* cited by examiner

VEHICLE LANE CHANGE CONTROL METHOD AND DEVICE

CROSS-REFERENCE TO RELATED APPLICATIONS

This application is the National Phase of International Application PCT/CN2019/092238, filed Jun. 21, 2019, which designated the United States. This application also includes a claim of priority under 35 U.S.C. 119(a) and § 365(b) to Chinese Application No. 201810652866.9 filed Jun. 22, 2018, the entirety of which is hereby incorporated by reference.

TECHNICAL FIELD

The present disclosure relates to the technical field of automatic control, and particularly relates to a method and device for controlling lane changing of a vehicle.

BACKGROUND

With the development of the technique of automatic control, unmanned vehicles are getting increasingly more attention. In unmanned vehicles, lane-changing controlling, as one of basic indexes of vehicle control, has many research approaches.

In the prior art, after a lane-changing controlling instruction has been received, the lane-changing controlling method to be performed usually is: according to the vehicle kinematics and a design control algorithm of a kinetic model, causing the vehicle to travel along a known trajectory, which is particularly such as the process shown in FIG. $1x$; and when the vehicle is changing lane, locating the position of the vehicle by using a high-accuracy locating system, and judging by using the position whether the vehicle has completed the lane changing. For example, if it is located that the vehicle has reached the predetermined position, it is determined that the vehicle has completed the lane changing, and then the vehicle is controlled to perform lane keeping. If it is located that the vehicle has not reached the predetermined position, it is determined that the vehicle has not completed the lane changing, and the lane changing operation is continued being executed.

However, the applicant has found when studying the above solution that, as the prior art relies on the high-accuracy locating system to realize the lane-changing controlling, in an aspect, the high-accuracy locating system has a high cost, which increases the cost of the lane-changing controlling of the vehicle, and, in another aspect, in the lane-changing controlling by using the high-accuracy locating system, it is required to frequently calculate by referring to the real-time position and the vehicle model, which has a high requirement on the operational capability of the controller, and has a large occupation of the resource of the controller.

SUMMARY

In view of the above, the present disclosure provides a method and device for controlling lane changing of a vehicle, to solve or partially solve the problem of the reliance of the lane-changing controlling on the high-accuracy locating system, which results in the high cost of the devices for the lane-changing controlling.

To achieve the above object, the technical solutions of the present disclosure are realized as follows:

A method for controlling lane changing of a vehicle, wherein the method comprises:
  receiving a lane changing instruction, wherein the lane changing instruction contains a target travelling lane;
  acquiring a speed parameter of the vehicle;
  according to the speed parameter, determining a controlling coefficient of a predetermined controller;
  lane-changing controlling, comprising: acquiring a position-deviation parameter and a heading-angle parameter of the vehicle; if the position-deviation parameter is greater than or equal to a first threshold, or, if the heading-angle parameter is greater than or equal to a second threshold, according to the controlling coefficient, the position-deviation parameter and the heading-angle parameter, determining a target steering-wheel steering angle of the vehicle; and according to the target steering-wheel steering angle, controlling the vehicle to perform a lane changing operation; and
  repeating the step of lane-changing controlling, till the position-deviation parameter is less than the first threshold, and the heading-angle parameter is less than the second threshold;
  wherein the position-deviation parameter refers to a transverse distance between a current position of the vehicle and the target travelling lane; and the heading angle refers to an included angle between a current course of the vehicle and the target travelling lane.

Optionally, the step of, according to the speed parameter, determining the controlling coefficient of the predetermined controller comprises:
  according to a matching relation between the speed parameter and a predetermined first parameter table, determining a first proportionality coefficient and a first differential coefficient that correspond to the speed parameter; and
  according to a matching relation between the speed parameter and a predetermined second parameter table, determining a second proportionality coefficient that corresponds to the speed parameter; and
  the step of, according to the controlling coefficient, the position-deviation parameter and the heading-angle parameter, determining the target steering-wheel steering angle of the vehicle comprises:
  according to the position-deviation parameter, the first proportionality coefficient and the first differential coefficient, by using a proportional-differential-control algorithm, determining a first steering-wheel steering angle;
  according to the heading-angle parameter and the second proportionality coefficient, by using a proportional-control algorithm, determining a second steering-wheel steering angle; and
  according to a predetermined rule, calculating on the first steering-wheel steering angle and the second steering-wheel steering angle, to obtain the target steering-wheel steering angle.

Optionally, before the step of, according to the speed parameter, determining the controlling coefficient of the predetermined controller, the method further comprises:
  fuzzifying a preset vehicle speed, to obtain a fuzzy domain of the preset vehicle speed, wherein the fuzzy domain of the preset vehicle speed contains: vehicle-speed fuzzy subsets and a vehicle-speed membership function;
  according to the vehicle-speed fuzzy subsets and the vehicle-speed membership function, determining a fuzzy domain of proportionality coefficients and a fuzzy domain of differential coefficients at different preset vehicle speeds, wherein the fuzzy domain of the proportionality coefficients contains: proportionality-coefficient fuzzy subsets and a proportionality-coefficient membership function; and the fuzzy domain of the differential coefficients contains: differential-coefficient fuzzy subsets and a differential-coefficient membership function; and according to a correspondence relation between the vehicle-speed fuzzy subsets, the vehicle-speed membership function, the proportionality-coefficient fuzzy subsets, the proportionality-coefficient membership function, the differential-coefficient fuzzy subsets and the differential-coefficient membership function, establishing the first parameter table.

Optionally, the step of, according to the matching relation between the speed parameter and the predetermined first parameter table, determining the first proportionality coefficient and the first differential coefficient that correspond to the speed parameter comprises:

determining a first vehicle-speed fuzzy subset that matches with the speed parameter;

determining a first speed end value and a second speed end value of the first vehicle-speed fuzzy subset;

determining a first-end-value proportionality coefficient and a first-end-value differential coefficient in the first parameter table that correspond to the first speed end value;

determining a second-end-value proportionality coefficient and a second-end-value differential coefficient in the first parameter table that correspond to the second speed end value;

determining a first membership coefficient, comprising: dividing a difference between the first speed end value and the speed parameter by a difference between the second speed end value and the first speed end value, to determine the first membership coefficient;

determining a second membership coefficient, comprising: dividing a difference between the second speed end value and the speed parameter by the difference between the second speed end value and the first speed end value, to determine the second membership coefficient;

determining the first proportionality coefficient, comprising: dividing a sum of a product between the first membership coefficient and the first-end-value proportionality coefficient and a product between the second membership coefficient and the second-end-value proportionality coefficient by a sum of the first membership coefficient and the second membership coefficient, to determine the first proportionality coefficient; and determining the first differential coefficient, comprising: dividing a sum of a product between the first membership coefficient and the first-end-value differential coefficient and a product between the second membership coefficient and the second-end-value differential coefficient by a sum of the first membership coefficient and the second membership coefficient, to determine the first differential coefficient.

Optionally, the step of, according to the position-deviation parameter, the first proportionality coefficient and the first differential coefficient, by using the proportional-differential-control algorithm, determining the first steering-wheel steering angle comprises:

according to a preset time duration, a predetermined configuration law and the position-deviation parameter, determining components of the position-deviation parameter at time moments within the preset time duration; and according to the first proportionality coefficient, the first differential coefficient and the components of the position-deviation parameter at the time moments, by using the proportional-differential-control algorithm, determining first steering-wheel steering angles at the time moments; and the step of, according to the predetermined rule, calculating on the first steering-wheel steering angle and the second steering-wheel steering angle, to obtain the target steering-wheel steering angle comprises:

according to the predetermined rule, calculating on the first steering-wheel steering angles at the time moments and the second steering-wheel steering angle, to obtain target steering-wheel steering angles at the time moments.

A device for controlling lane changing of a vehicle, wherein the device comprises:

a lane-changing-instruction receiving module configured for receiving a lane changing instruction, wherein the lane changing instruction contains a target travelling lane;

a speed-parameter acquiring module configured for acquiring a speed parameter of the vehicle;

a controlling-coefficient determining module configured for, according to the speed parameter, determining a controlling coefficient of a predetermined controller; and a lane-changing controlling module configured for acquiring a position-deviation parameter and a heading-angle parameter of the vehicle; if the position-deviation parameter is greater than or equal to a first threshold, or, if the heading-angle parameter is greater than or equal to a second threshold, according to the controlling coefficient, the position-deviation parameter and the heading-angle parameter, determining a target steering-wheel steering angle of the vehicle; and according to the target steering-wheel steering angle, controlling the vehicle to perform a lane changing operation, till the position-deviation parameter is less than the first threshold, and the heading-angle parameter is less than the second threshold; wherein the position-deviation parameter refers to a transverse distance between a current position of the vehicle and the target travelling lane; and the heading angle refers to an included angle between a current course of the vehicle and the target travelling lane.

Optionally, the controlling-coefficient determining module comprises:

a first determining submodule configured for, according to a matching relation between the speed parameter and a predetermined first parameter table, determining a first proportionality coefficient and a first differential coefficient that correspond to the speed parameter; and a second determining submodule configured for, according to a matching relation between the speed parameter and a predetermined second parameter table, determining a second proportionality coefficient that corresponds to the speed parameter; and the lane-changing controlling module comprises:

a first-steering-wheel-steering-angle determining submodule configured for, according to the position-deviation parameter, the first proportionality coefficient and the first differential coefficient, by using a proportional-differential-control algorithm, determining a first steering-wheel steering angle;

a second-steering-wheel-steering-angle determining submodule configured for, according to the heading-angle parameter and the second proportionality coefficient, by using a proportional-control algorithm, determining a second steering-wheel steering angle; and a target-steering-wheel-steering-angle determining submodule configured for, according to a predetermined rule, calculating on the first steering-wheel steering angle and the second steering-wheel steering angle, to obtain the target steering-wheel steering angle.

Optionally, the device further comprises:

a vehicle-speed fuzzifying module configured for fuzzifying a preset vehicle speed, to obtain a fuzzy domain of the preset vehicle speed, wherein the fuzzy domain of the preset vehicle speed contains: vehicle-speed fuzzy subsets and a vehicle-speed membership function;

a fuzzy-domain determining module configured for, according to the vehicle-speed fuzzy subsets and the vehicle-speed membership function, determining a fuzzy domain of proportionality coefficients and a fuzzy domain of differential coefficients at different preset vehicle speeds, wherein the fuzzy domain of the proportionality coefficients contains: proportionality-coefficient fuzzy subsets and a proportionality-coefficient membership function; and the fuzzy domain of the differential coefficients contains: differential-coefficient fuzzy subsets and a differential-coefficient membership function; and a first-parameter-table establishing module configured for, according to a correspondence relation between the vehicle-speed fuzzy subsets, the vehicle-speed membership function, the proportionality-coefficient fuzzy subsets, the proportionality-coefficient membership function, the differential-coefficient fuzzy subsets and the differential-coefficient membership function, establishing the first parameter table.

Optionally, the first-steering-wheel-steering-angle determining submodule comprises:

a position-deviation-parameter-component determining unit configured for, according to a preset time duration, a predetermined configuration law and the position-deviation parameter, determining components of the position-deviation parameter at time moments within the preset time duration; and a first-steering-wheel-steering-angle determining unit configured for, according to the first proportionality coefficient, the first differential coefficient and the components of the position-deviation parameter at the time moments, by using the proportional-differential-control algorithm, determining first steering-wheel steering angles at the time moments; and the target-steering-wheel-steering-angle determining submodule comprises:

a target-steering-wheel-steering-angle determining unit configured for, according to the predetermined rule, calculating on the first steering-wheel steering angles at the time moments and the second steering-wheel steering angle, to obtain target steering-wheel steering angles at the time moments.

A vehicle, wherein the vehicle comprises the device for controlling lane changing of a vehicle of any one of the above items.

A computer program, wherein the computer program comprises a computer-readable code, and when the computer-readable code is executed on a calculating and processing device, the computer-readable code causes the calculating and processing device to implement the method for controlling lane changing of a vehicle of any one of the above items.

A computer-readable medium, wherein the computer-readable medium stores the computer program described above.

As compared with the prior art, the method for controlling lane changing of a vehicle according to the present disclosure has the following advantages:

In the method for controlling lane changing of a vehicle according to the embodiments of the present disclosure, after the lane changing instruction has been received, according to the speed parameter of the vehicle, the transverse position distance between the vehicle and the target travelling lane and the included angle between the course of the vehicle and the target travelling lane, the lane-changing controlling can be realized by using the controller. Particularly, after the lane changing instruction has been received, firstly the control parameter of the predetermined controller is determined according to the speed parameter, then the predetermined controller, according to the two variables, the position-deviation parameter and the heading-angle parameter of the vehicle, determines the target steering-wheel steering angle of the vehicle, and the vehicle may be controlled to perform the lane changing operation by using the target steering-wheel steering angle. The position-deviation parameter and the heading-angle parameter are continuously acquired, to perform the lane changing operation, till the position-deviation parameter is less than the first threshold, and the heading-angle parameter is less than the second threshold, when it can be considered that the vehicle is in the target travelling lane, and is travelling along the target travelling lane; in other words, the lane changing of the vehicle has been completed. The embodiments of the present disclosure, by using the speed parameter, the position-deviation parameter and the heading angle, control the vehicle to change lane and determine whether the lane changing has completed, wherein the speed parameter, the position-deviation parameter and the heading angle can be acquired by using a speed sensor and an onboard camera, and do not require to rely on a high-accuracy locating system, which can greatly reduce the cost of the vehicle lane changing and the occupation of the resource of the controller.

The above description is merely a summary of the technical solutions of the present disclosure. In order to more clearly know the elements of the present disclosure to enable the implementation according to the contents of the description, and in order to make the above and other purposes, features and advantages of the present disclosure more apparent and understandable, the particular embodiments of the present disclosure are provided below.

BRIEF DESCRIPTION OF THE DRAWINGS

In order to more clearly illustrate the technical solutions of the embodiments of the present disclosure or the prior art, the figures that are required to describe the embodiments or the prior art will be briefly introduced below. Apparently, the figures that are described below are embodiments of the present disclosure, and a person skilled in the art can obtain other figures according to these figures without paying creative work.

FIG. 1 is a flow chart of the steps of the method for controlling lane changing of a vehicle according to an embodiment of the present disclosure;

DETAILED DESCRIPTION

In order to make the objects, the technical solutions and the advantages of the embodiments of the present disclosure clearer, the technical solutions of the embodiments of the present disclosure will be clearly and completely described below with reference to the drawings of the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

It should be noted that, subject to the avoiding of any conflict, the embodiments and the features of the embodiments of the present disclosure can be combined.

The present disclosure will be described in detail below with reference to the drawings and the embodiments.

Figure 1X:
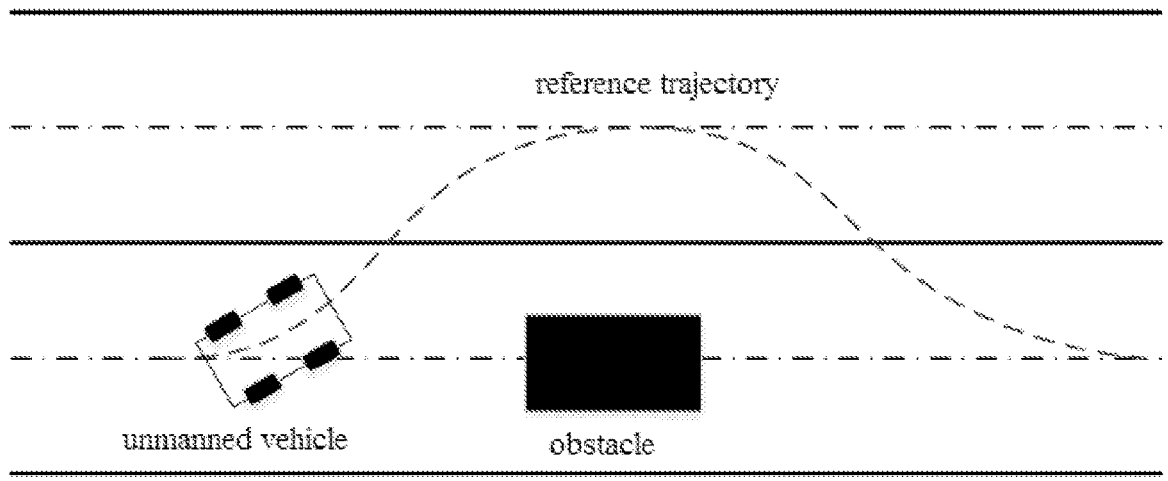
FIG. 1$x$ is a schematic diagram of a trajectory of vehicle lane changing in the prior art.
Figure 1:
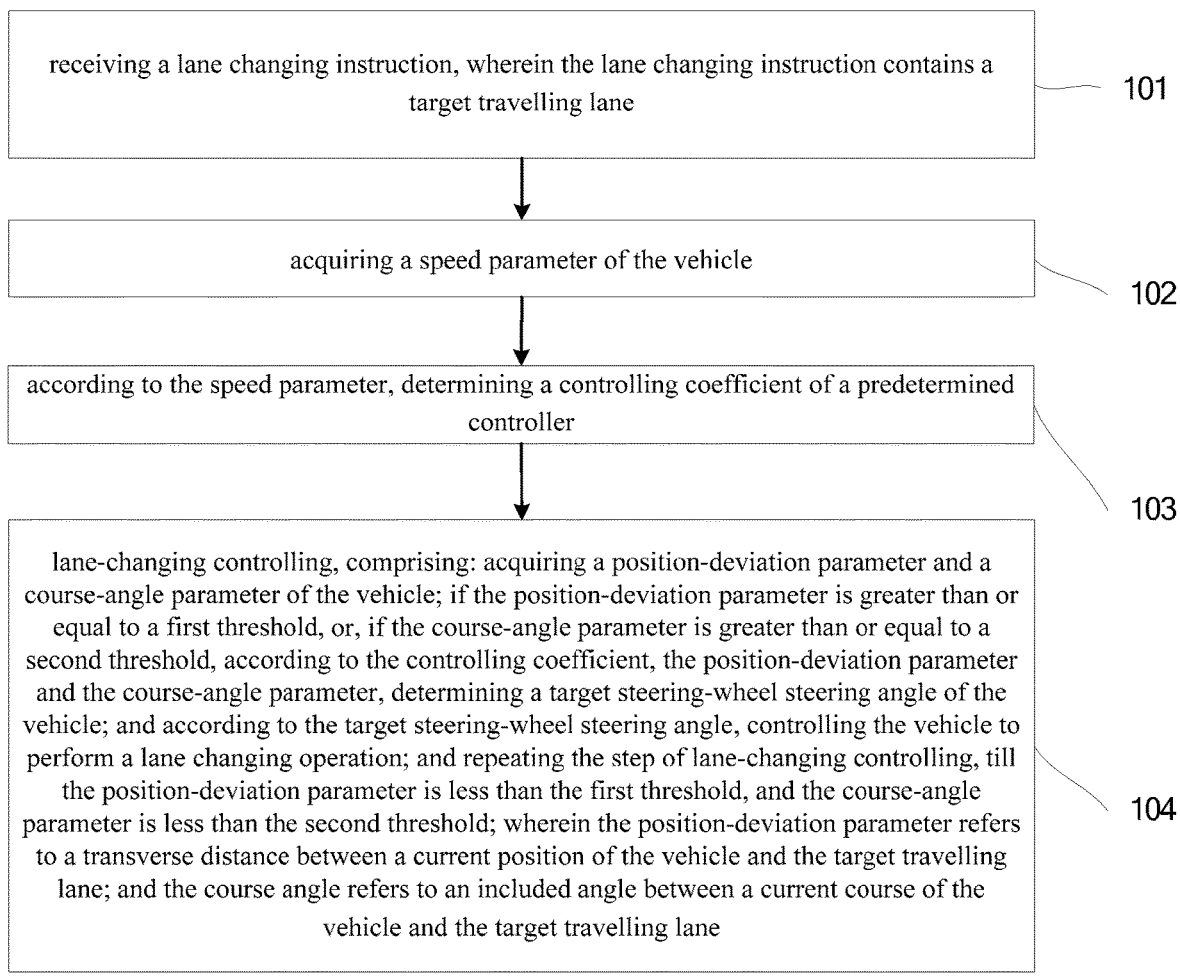

As shown in FIG. 1, FIG. 1 shows a flow chart of the steps of the method for controlling lane changing of a vehicle according to an embodiment of the present disclosure.

Figure 2:
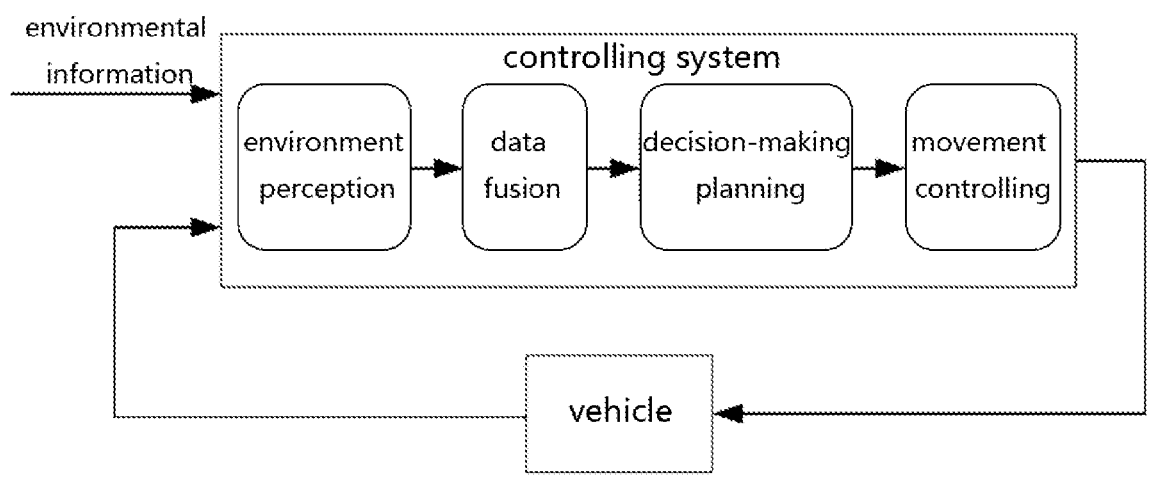
FIG. 2 is a schematic diagram of a controlling system according to an embodiment of the present disclosure.

The embodiments of the present disclosure may be used for unmanned vehicles. The design and development of unmanned systems may generally comprise the critical techniques of four parts: environment perception, data fusion, decision-making planning and movement controlling. As shown in FIG. 2, in order to realize autopilot, firstly an unmanned vehicle is required to, like human beings, sufficiently "know" the ambient environment, including all of the environmental data that can influence the driving action, such as the surrounding vehicles, the pedestrian, the road labels, the road surface and the weather, which refers to environment perception. Secondly, the controlling system processes all of the collected sensor data, including extraction, screening, filtering and comparison, to finally obtain a stable signal that can truly reflect the information of the ambient environment of the vehicle, which refers to data fusion. Further, the controlling system, according to the fused information, makes the corresponding "determination and planning", including maintaining travelling in the current road, lane changing, travelling trajectory, travelling speed and so on, which refers to decision-making planning. Finally, the controlling system, according to the received decision-making instruction, controls the vehicle to complete the corresponding action, including maintaining travelling in the current lane, changing lane, travelling at the specified speed, travelling by following the vehicle ahead and so on, which refers to movement controlling.

Figure 3:
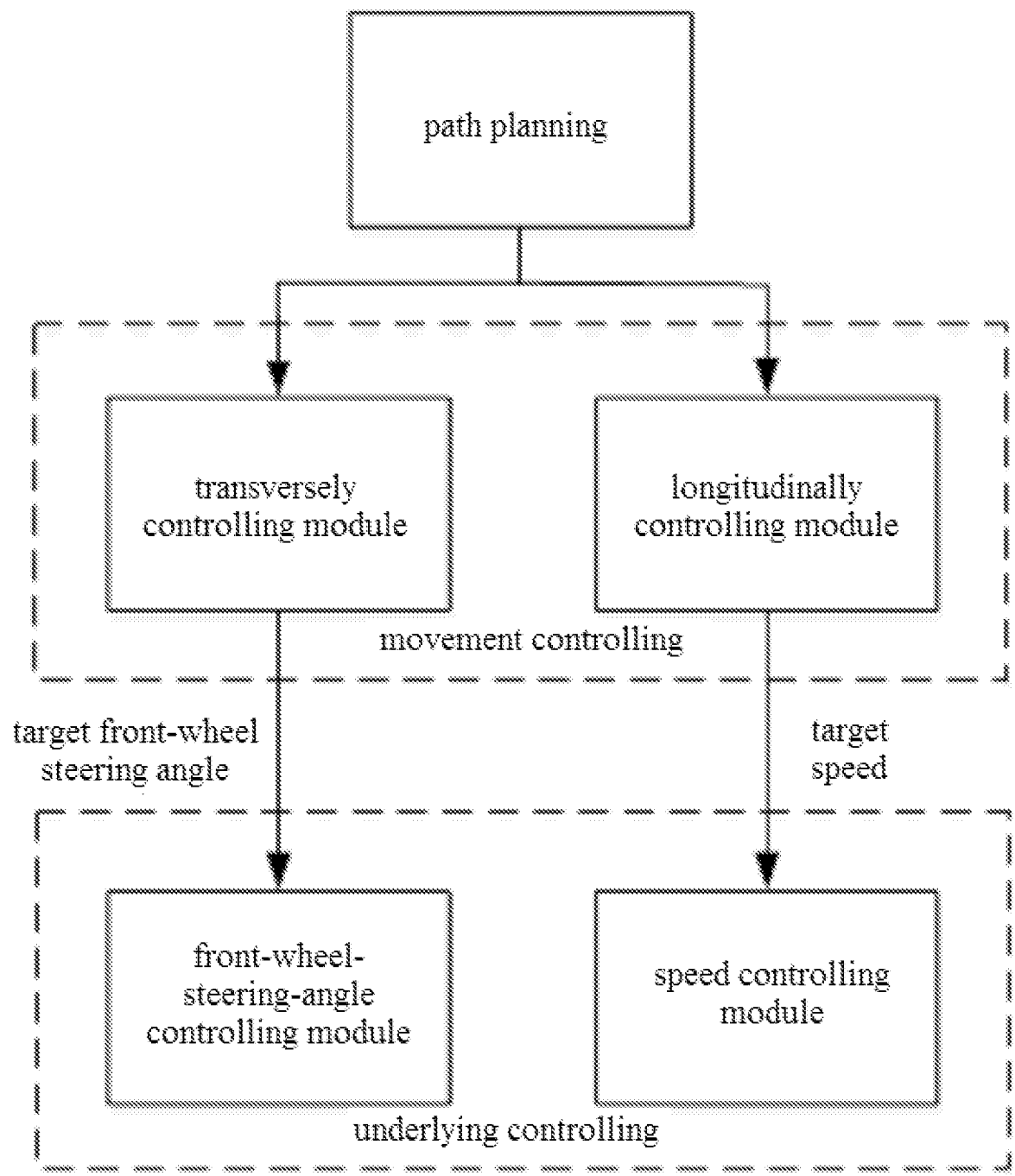
FIG. 3 is a schematic diagram of the path planning according to an embodiment of the present disclosure.

The movement controlling of vehicles is a key technique of autopilot systems. The movement controlling may generally comprise transverse controlling and longitudinal controlling. As shown in FIG. 3, the transverse controlling mainly realizes the controlling on the steering of the vehicle, which aims at controlling the vehicle to travel by following a certain trajectory (path), and the longitudinal controlling mainly realizes the controlling on the speed of the vehicle, which aims at controlling the vehicle to travel at a certain speed. The coupling between the transverse controlling and the longitudinal controlling realizes the automatic controlling by the system on the vehicle.

The method for controlling lane changing of a vehicle comprises:

Step 101: receiving a lane changing instruction, wherein the lane changing instruction contains a target travelling lane.

In particular applications, the lane changing instruction may be sent by the controlling system. Particularly, after the unmanned vehicle system has performed the environment perception and the data fusion, the controlling system makes the decision-making planning of changing lane, and emits the lane changing instruction. The lane changing instruction contains the information of the target travelling lane, and the target travelling lane may be the lane where the vehicle travels after the lane changing has completed.

Step 102: acquiring a speed parameter of the vehicle.

In an embodiment of the present disclosure, the current speed parameter of the vehicle may be acquired by using the vehicle speed sensor of the vehicle, and the controller may read the speed parameter by using a bus. Certainly, a person skilled in the art may also acquire the speed parameter of the vehicle by using another mode according to the practical application scene, which is not particularly limited in the embodiments of the present disclosure.

Step 103: according to the speed parameter, determining a controlling coefficient of a predetermined controller.

In an embodiment of the present disclosure, the predetermined controller may be a PID (proportion integration differentiation) controller.

Generally, the PID controller comprises a proportion unit (P), an integration unit (I) and a differentiation unit (D). The relation between its input e(t) and its output u(t) is:

$$u(t) = kp\left[e(t) + \frac{3}{T1}\int e(t)dt + TD*de(t)/dt\right]$$

The upper limit and the lower limit of the integration in the formula are respectively 0 and t.

The transfer function of the PID controller is:

$$G(s) = \frac{U(s)}{E(s)} = kp\left[1 + \frac{1}{TI*s} + TD*s\right]$$

wherein kp is the proportionality coefficient, TI is the integration time constant, and TD is the derivative time constant.

Figure 4:
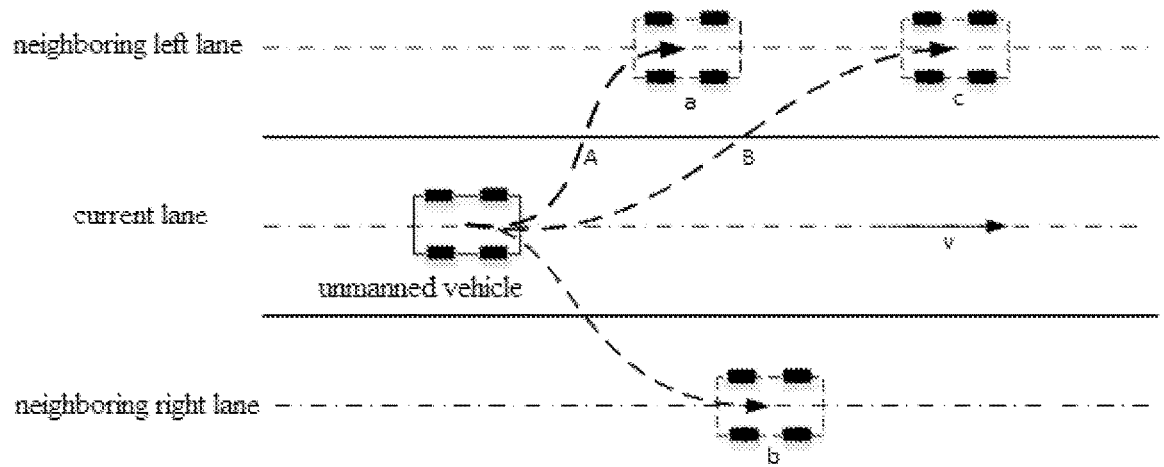
FIG. 4 is a diagram of the lane-changing trajectories of different vehicle speeds according to an embodiment of the present disclosure.

In particular applications, the travelling speed of the vehicle influences the travelling trajectory of the lane changing. As shown in FIG. 4, at a low speed, the position that the vehicle finally reaches after the leftward lane changing is a, and at a high speed, the position that the vehicle finally reaches after the leftward lane changing is c, which generate different movement trajectories A and B respectively. In the same manner, if at a certain moment the vehicle changes lane rightwardly, it might reach the position b, and the longitudinal position of the point b is also decided by the difference of the vehicle speeds. Therefore, the speed parameter of the vehicle is used as an important parameter for the lane-changing controlling of the vehicle, and the controlling coefficient of the predetermined controller is determined according to the speed parameter, which, as compared with, as a conventional solution, using the deviation and the deviation change rate as the input of the PID controller, can further meet the current lane changing state of the vehicle, and can make the controlling of the lane changing process simpler.

Step 104: lane-changing controlling, comprising: acquiring a position-deviation parameter and a heading-angle parameter of the vehicle; if the position-deviation parameter is greater than or equal to a first threshold, or, if the heading-angle parameter is greater than or equal to a second threshold, according to the controlling coefficient, the position-deviation parameter and the heading-angle parameter, determining a target steering-wheel steering angle of the vehicle; and according to the target steering-wheel steering angle, controlling the vehicle to perform a lane changing operation; and repeating the step of lane-changing controlling, till the position-deviation parameter is less than the first threshold, and the heading-angle parameter is less than the second threshold; wherein the position-deviation parameter refers to a transverse distance between a current position of the vehicle and the target travelling lane; and the heading angle refers to an included angle between a current course of the vehicle and the target travelling lane.

Figure 5:
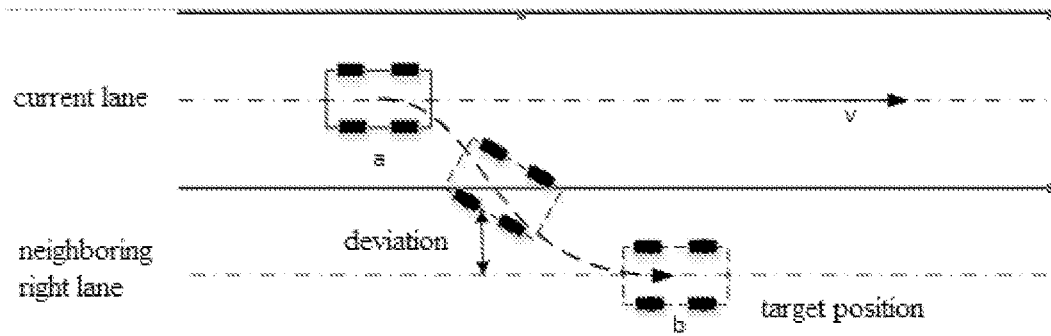
FIG. 5 is a schematic diagram of the position deviation according to an embodiment of the present disclosure.
Figure 6:
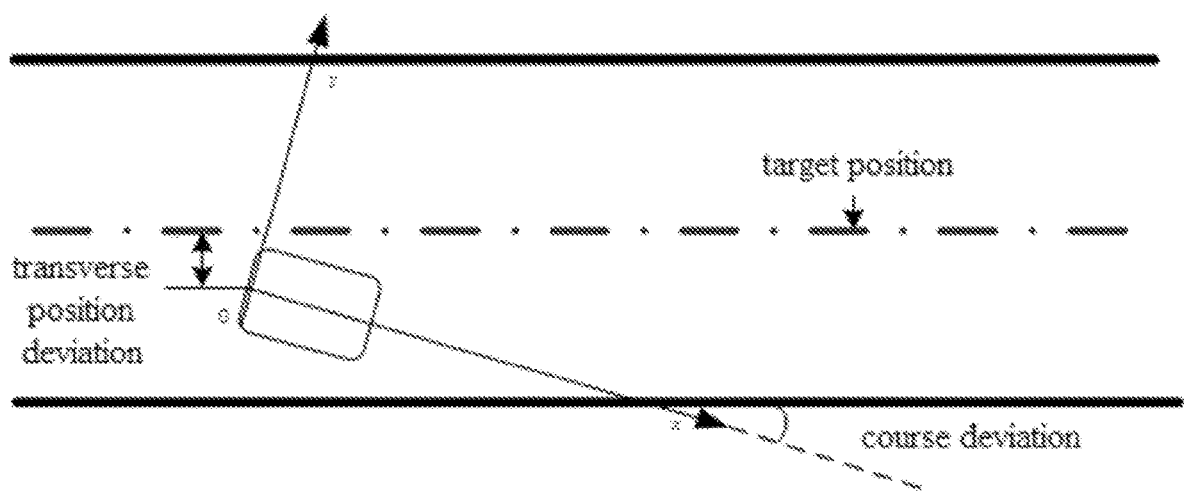
FIG. 6 is a schematic diagram of the heading angle according to an embodiment of the present disclosure.

In an embodiment of the present disclosure, the criterion of considering that the vehicle has completed the lane changing generally is: the transverse position is in the target travelling lane, and the course of the vehicle is consistent with the target travelling lane. In the transverse controlling, as shown in FIG. 5, the controller may, according to the current position of the vehicle itself and the position of the target travelling lane, calculate to obtain the position-deviation parameter; and, according to the position-deviation parameter, perform PID operation, to obtain a steering-angle controlled quantity, output the steering-angle controlled quantity to an electric-power-steering controlling unit (EPS) to control the vehicle to steer, and with the movement of the vehicle, gradually eliminate the position deviation. When the position deviation has been completely eliminated, the vehicle has reached the target transverse position, thereby realizing the lane changing. In the course controlling, as shown in FIG. 6, the controller may, according to the current travelling direction of the vehicle and the direction of the target travelling lane, determine the heading-angle parameter; and introduce the heading-angle parameter as a controlled variable of the controller, and set the target value of the included angle between the direction of the vehicle and the direction of the road to be 0. After the controller has eliminated the course deviation, the direction of the vehicle is consistent with the direction of the road, thereby enabling the vehicle to travel along the lane.

Figure 7:
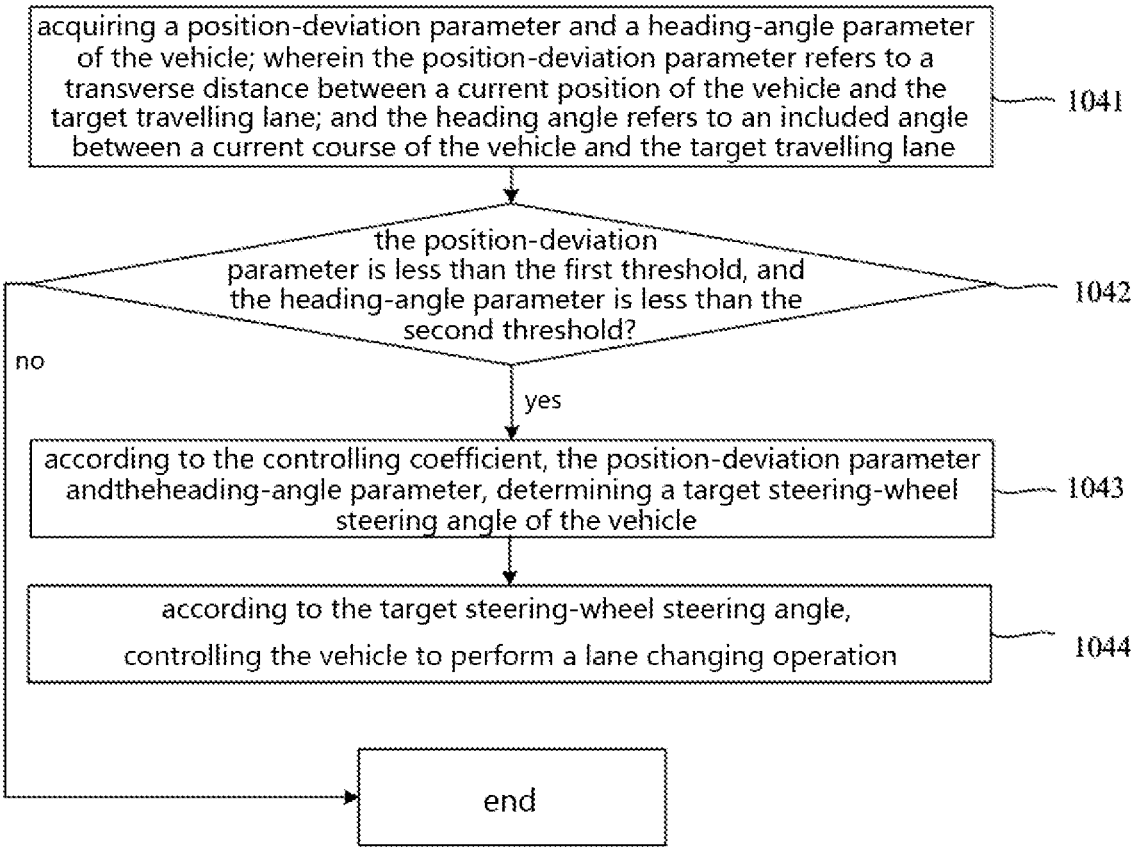
FIG. 7 is a flow chart of the steps of the lane-changing controlling of the method for controlling lane changing of a vehicle according to an embodiment of the present disclosure.

In particular applications, the steps of completing the lane changing are shown in FIG. 7, and particularly are:

Step 1041: acquiring a position-deviation parameter and a heading-angle parameter of the vehicle; wherein the position-deviation parameter refers to a transverse distance between a current position of the vehicle and the target travelling lane; and the heading angle refers to an included angle between a current course of the vehicle and the target travelling lane.

Step 1042: judging whether it has been reached that the position-deviation parameter is less than the first threshold, and the heading-angle parameter is less than the second threshold; if yes, ending; and if no, executing the step 1043 and the step 1044.

Step 1043: according to the controlling coefficient, the position-deviation parameter and the heading-angle parameter, determining a target steering-wheel steering angle of the vehicle.

Step 1044: according to the target steering-wheel steering angle, controlling the vehicle to perform a lane changing operation.

In an embodiment of the present disclosure, the target steering-wheel steering angle may be the angle by which the controller will control the steering wheel to steer, and the lane-changing operation of the vehicle is controlled by using the rotation of the steering wheel.

In conclusion, in the method for controlling lane changing of a vehicle according to the embodiments of the present disclosure, after the lane changing instruction has been received, according to the speed parameter of the vehicle, the transverse position distance between the vehicle and the target travelling lane and the included angle between the course of the vehicle and the target travelling lane, the lane-changing controlling can be realized by using the controller. Particularly, after the lane changing instruction has been received, firstly the control parameter of the predetermined controller is determined according to the speed parameter, then the predetermined controller, according to the two variables, the position-deviation parameter and the heading-angle parameter of the vehicle, determines the target steering-wheel steering angle of the vehicle, and the vehicle may be controlled to perform the lane changing operation by using the target steering-wheel steering angle. The position-deviation parameter and the heading-angle parameter are continuously acquired, to perform the lane changing operation, till the position-deviation parameter is less than the first threshold, and the heading-angle parameter is less than the second threshold, when it can be considered that the vehicle is in the target travelling lane, and is travelling along the target travelling lane; in other words, the lane changing of the vehicle has been completed. The embodiments of the present disclosure, by using the speed parameter, the position-deviation parameter and the heading angle, control the vehicle to change lane and determine whether the lane changing has completed, wherein the speed parameter, the position-deviation parameter and the heading angle can be acquired by using a speed sensor and an onboard camera, and do not require to rely on a high-accuracy locating system, which can greatly reduce the cost of the vehicle lane changing and the occupation of the resource of the controller.

Figure 8:
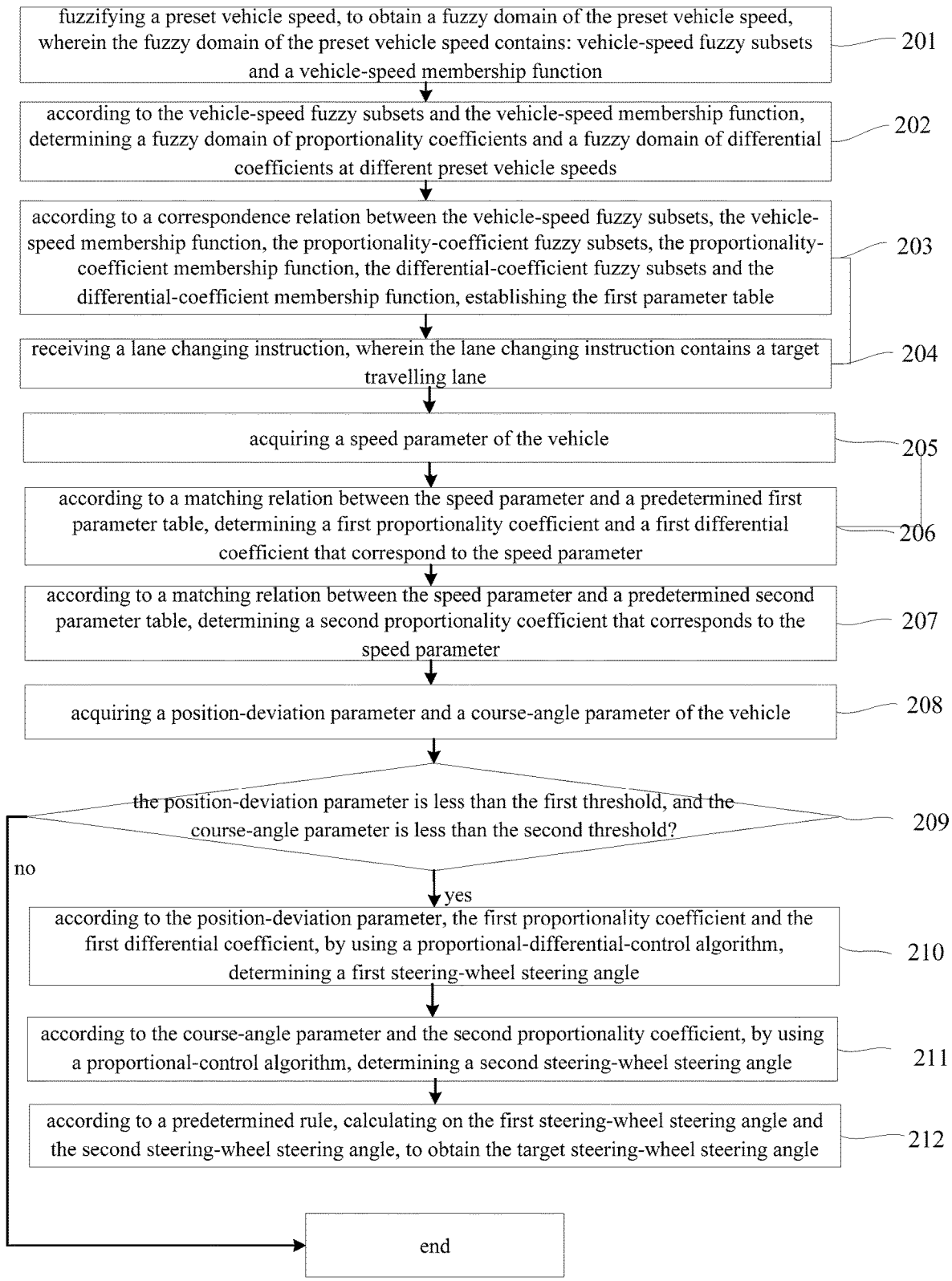
FIG. 8 is a flow chart of the particular steps of the method for controlling lane changing of a vehicle according to an embodiment of the present disclosure.

As shown in FIG. 8, FIG. 8 shows a flow chart of the particular steps of the method for controlling lane changing of a vehicle according to an embodiment of the present disclosure. The method particularly comprises:

Step 201: fuzzifying a preset vehicle speed, to obtain a fuzzy domain of the preset vehicle speed, wherein the fuzzy domain of the preset vehicle speed contains: vehicle-speed fuzzy subsets and a vehicle-speed membership function.

Step 202: according to the vehicle-speed fuzzy subsets and the vehicle-speed membership function, determining a fuzzy domain of proportionality coefficients and a fuzzy domain of differential coefficients at different preset vehicle speeds, wherein the fuzzy domain of the proportionality coefficients contains: proportionality-coefficient fuzzy subsets and a proportionality-coefficient membership function; and the fuzzy domain of the differential coefficients contains: differential-coefficient fuzzy subsets and a differential-coefficient membership function.

Step 203: according to a correspondence relation between the vehicle-speed fuzzy subsets, the vehicle-speed membership function, the proportionality-coefficient fuzzy subsets, the proportionality-coefficient membership function, the differential-coefficient fuzzy subsets and the differential-coefficient membership function, establishing the first parameter table.

The vehicle speed of the vehicle when the vehicle receives the lane changing instruction is variable, and the controlled quantities outputted by the lane-changing controller at different vehicle speeds are different. In other words, when the vehicle speed is low, the driver is required to rotate a large steering-wheel steering angle to control the vehicle to complete the lane changing, and when the vehicle speed is high, the driver is merely required to rotate a small steering-wheel steering angle to control the vehicle to change lane. Therefore, in the designing of the PID controller, it is required to regulate to obtain different P, I and D parameters according to the variation of the vehicle speed, merely by which the self-adaption of the controller to the vehicle speed can be realized, thereby realizing the self-adaptive control by the system on the vehicle.

Figure 9:
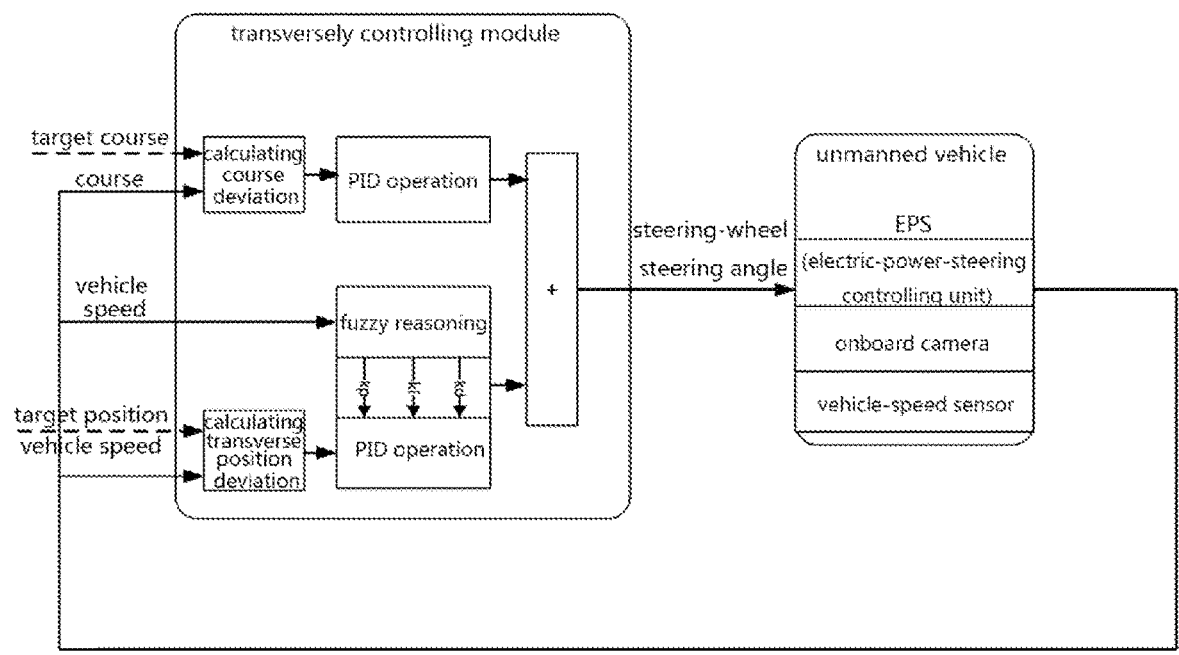
FIG. 9 is a schematic diagram of the designing of the lane-changing controlling according to an embodiment of the present disclosure.

An embodiment of the present disclosure may comprise establishing in advance in the testing system a closed-loop control system based on the controller, the vehicle, the sensors and an executing unit; by using the design concept shown in FIG. 9, presetting in the testing system different threshold vehicle speeds; and by using the fuzzy PID control theory, determining the first parameter table.

In particular applications, the first parameter table may be determined in advance by using the step 201 to the step 203.

The fuzzy-control module generally comprises four components: an input-quantity fuzzifying interface, an output-quantity clarifying interface, fuzzy reasoning and a knowledge base. In an embodiment of the present disclosure, the preset vehicle speed is used as the input of the fuzzy-control module, and the coefficients KP and KD of P and D are used as the output of the fuzzy-control module.

For example, in order for the simplicity of the mathematics expression and operation, triangular function is selected as the membership function of the input and output fuzzy subsets.

The fuzzy domain of the input (the preset vehicle speed) contains: vehicle-speed fuzzy subsets and a vehicle-speed membership function.

The vehicle-speed fuzzy subsets may be continuous subsets that have a constant end-point difference. Taking the end-point difference of 5 as the example, the vehicle-speed fuzzy subsets may be the following subsets:

[0,5]; [5,10]; [10,15]; [15,20]; [20,25]; [25,30]; [30,35]; [35,40];

[40,45]; [45,50]; [50,55]; [55,60]; [60,65]; [65,70]; [70,75]; [75,80];

[80,85]; [85,90]; [90,95]; [95,100]; [105,110]; [110,115]; [115,120].

Figure 10:
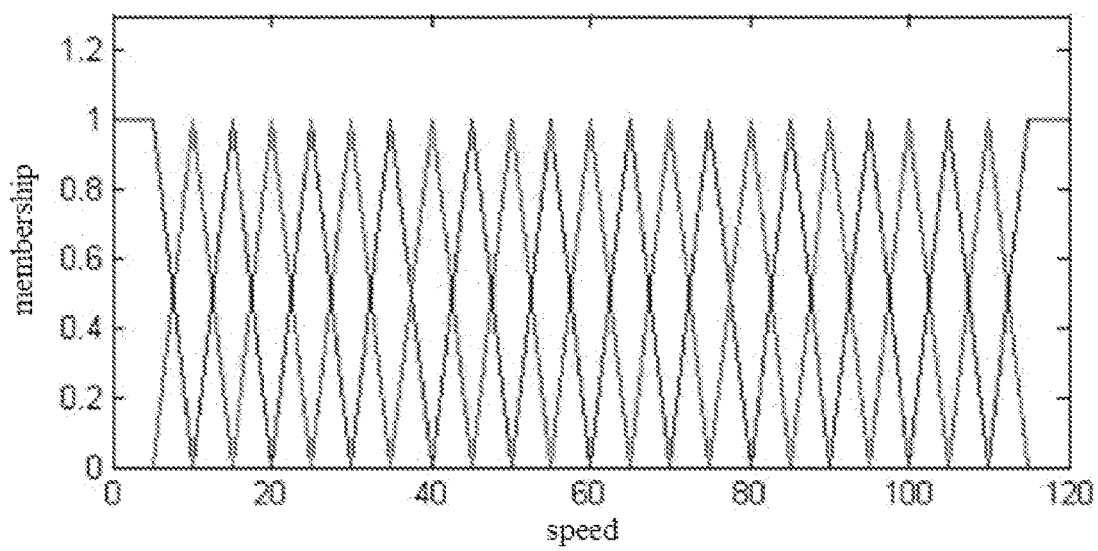
FIG. 10 is a schematic diagram of the vehicle-speed membership function according to an embodiment of the present disclosure.

The corresponding vehicle-speed membership function is shown in FIG. 10, wherein if the speed is closer to the end values, the membership is higher.

The fuzzy domain of the outputted proportionality coefficients KP contains: proportionality-coefficient fuzzy subsets and a proportionality-coefficient membership function.

By using the above vehicle-speed fuzzy subsets as the input, by testing, the proportionality-coefficient fuzzy subsets may be:

[1.3,1.3]; [1.3,1.4]; [1.4,1.5]; [1.5,1.6]; [1.6,1.73]; [1.73,1.8]; [1.8,2]; [2,2.3]; [2.3,2.6]; [2.6,2.8]; [2.8,3.0]; [3.0,3.3]; [3.3,4.3]; [4.3,5.0]; [5.0,6.5]; [6.5,8.0]; [8.0,11]; [11,13]; [13,17]; [17,24]; [24,27]; [27,38]; [38,45].

Figure 11:
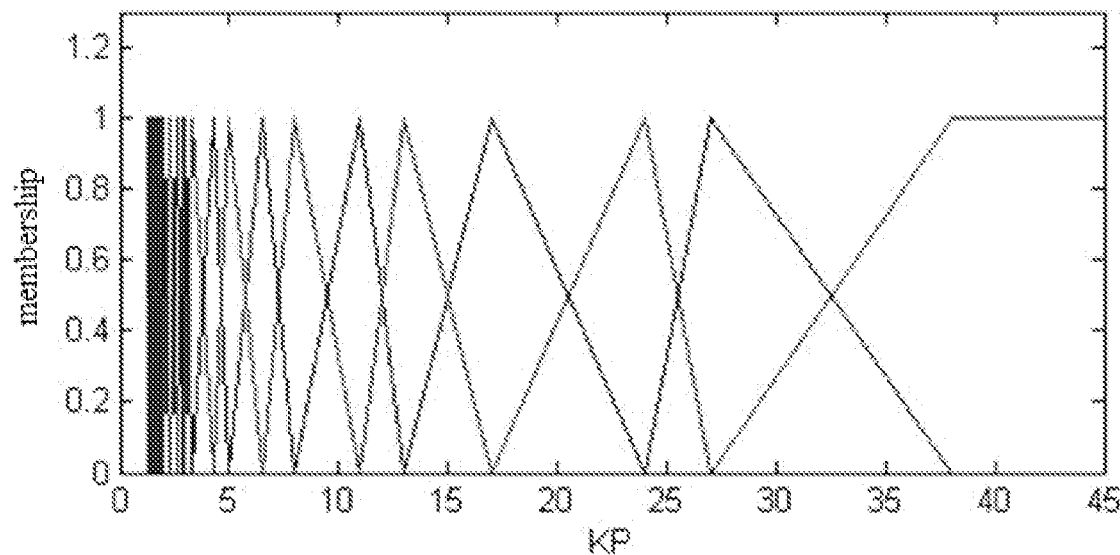
FIG. 11 is a schematic diagram of the proportionality-coefficient membership function according to an embodiment of the present disclosure.

The corresponding proportionality-coefficient membership function is shown in FIG. 11.

The fuzzy domain of the outputted differential coefficients KD contains: differential-coefficient fuzzy subsets and a differential-coefficient membership function.

By using the above vehicle-speed fuzzy subsets as the input, by testing, the differential-coefficient fuzzy subsets may be:

[0,0]; [0,0.7]; [0.7,0.9]; [0.9,0.95]; [0.95,1]; [1,1.1]; [1.1,1.2.]; [1.2,1.3]; [1.3,2]; [2,2.5]; [2.5,3].

Figure 12:
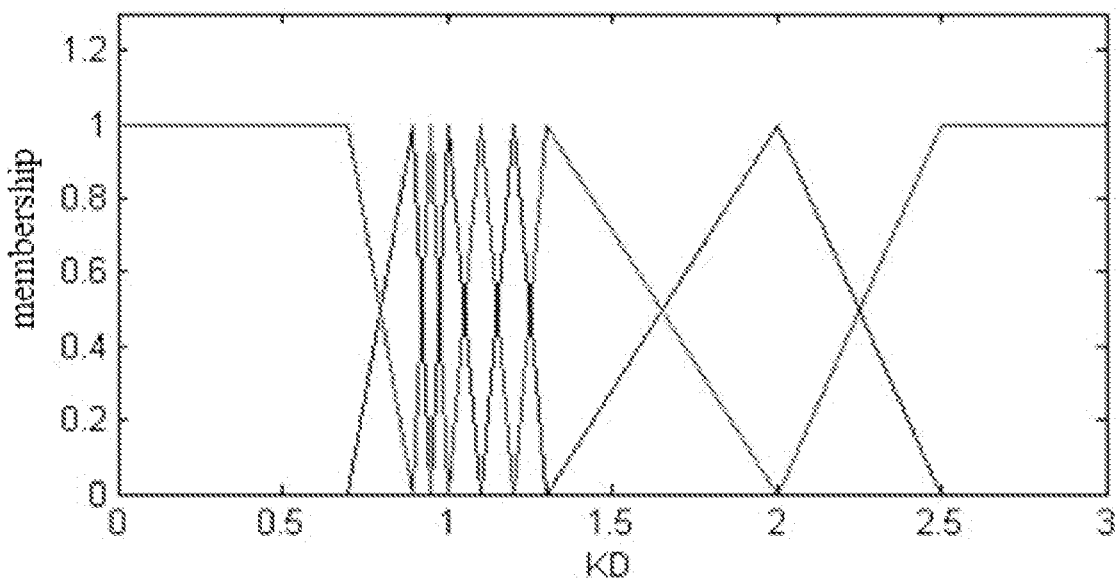
FIG. 12 is a schematic diagram of the differential-coefficient membership function according to an embodiment of the present disclosure.

The corresponding differential-coefficient membership function is shown in FIG. 12.

According to a correspondence relation between the vehicle-speed fuzzy subsets, the vehicle-speed membership function, the proportionality-coefficient fuzzy subsets, the proportionality-coefficient membership function, the differential-coefficient fuzzy subsets and the differential-coefficient membership function, a first parameter table may be established as the knowledge base by using the different preset vehicle speeds. The first parameter table may particularly be Table 1:

TABLE 1

| KP, KD speed (kph) | KP | KD |
|---|---|---|
| 5 | 45 | 0 |
| 10 | 38 | 0 |
| 15 | 27 | 0 |
| 20 | 24 | 0 |
| 25 | 17 | 0 |
| 30 | 13 | 0 |
| 35 | 11 | 2 |
| 40 | 8 | 3 |
| 45 | 6.5 | 2 |
| 50 | 5 | 2 |
| 55 | 4.3 | 2.5 |
| 60 | 3.3 | 1 |
| 65 | 3 | 1.3 |
| 70 | 2.8 | 1.3 |
| 75 | 2.6 | 1.2 |
| 80 | 2.3 | 1.1 |
| 85 | 2 | 0.7 |
| 90 | 1.8 | 0.7 |
| 95 | 1.73 | 0.7 |
| 100 | 1.6 | 0.7 |
| 105 | 1.5 | 0.95 |
| 110 | 1.4 | 1 |
| 115 | 1.3 | 0.9 |
| 120 | 1.3 | 0.9 |

If a fuzzy rule is expressed by using a fuzzy language, Table 1 may be:
If speed is 5, then kp is 40 and kd is 0;
If speed is 10, then kp is 38 and kd is 0;
. . .
If speed is 120, then kp is 1.3 and kd is 0.9.

Sequentially, 24 fuzzy rules can be determined. Regarding different speed parameters, the corresponding proportionality coefficients and differential coefficients may be determined by looking up the parameters in Table 1.

Step 204: receiving a lane changing instruction, wherein the lane changing instruction contains a target travelling lane.

Step 205: acquiring a speed parameter of the vehicle.

Step 206: according to a matching relation between the speed parameter and a predetermined first parameter table, determining a first proportionality coefficient and a first differential coefficient that correspond to the speed parameter.

PID control, as a classical control theory, has a profound foundation, extensive applications, a simple design and a good feasibility, and, as compared with modern control approaches such as MPC (model predictive control), neural-network control and sliding-mode control, has good engineering feasibility and generalizability. Furthermore, the algorithms that are designed by using PID control have a high operation efficiency in the controller, which can reduce the load of the CPU.

In an embodiment of the present disclosure, the first proportionality coefficient and the first differential coefficient that are obtained according to the first parameter table may be used to eliminate the position-deviation parameter. In practical applications, the vehicle-speed parameters of the first parameter table are discontinuous, but the vehicle speed in the actual driving process varies continuously. Therefore, there are always cases in which the acquired speed parameter cannot be looked up in the first parameter table. In such a case, the parameter value in the first parameter table that is most close to the acquired vehicle-speed parameter may be determined, and the first proportionality coefficient and the first differential coefficient that correspond to the speed parameter are determined by using the parameter value.

It can be understand that the mode of determining the parameter value in the first parameter table that is most close to the acquired vehicle-speed parameter and determining the first proportionality coefficient and the first differential coefficient that correspond to the speed parameter by using the parameter value, because it is a pre-estimated parameter value, results in that the first proportionality coefficient and the first differential coefficient that are determined are not accurate sufficiently, which affects the accuracy of the control on the lane-changing process. In order to solve the problem, preferably, in an embodiment of the present disclosure, the step of, according to the matching relation between the speed parameter and the predetermined first parameter table, determining the first proportionality coefficient and the first differential coefficient that correspond to the speed parameter comprises:

Step A1: determining a first vehicle-speed fuzzy subset that matches with the speed parameter.

Step A2: determining a first speed end value and a second speed end value of the first vehicle-speed fuzzy subset.

Step A3: determining a first-end-value proportionality coefficient and a first-end-value differential coefficient in the first parameter table that correspond to the first speed end value.

Step A4: determining a second-end-value proportionality coefficient and a second-end-value differential coefficient in the first parameter table that correspond to the second speed end value.

Step A5: determining a first membership coefficient, comprising: dividing a difference between the first speed end value and the speed parameter by a difference between the second speed end value and the first speed end value, to determine the first membership coefficient.

Step A6: determining a second membership coefficient, comprising: dividing a difference between the second speed end value and the speed parameter by the difference between the second speed end value and the first speed end value, to determine the second membership coefficient.

Step A7: determining the first proportionality coefficient, comprising: dividing a sum of a product between the first membership coefficient and the first-end-value proportionality coefficient and a product between the second membership coefficient and the second-end-value proportionality coefficient by a sum of the first membership coefficient and the second membership coefficient, to determine the first proportionality coefficient.

Step A8: determining the first differential coefficient, comprising: dividing a sum of a product between the first membership coefficient and the first-end-value differential coefficient and a product between the second membership coefficient and the second-end-value differential coefficient by a sum of the first membership coefficient and the second membership coefficient, to determine the first differential coefficient.

In particular applications, taking the case in which the first parameter table is Table 1 and the value of the speed parameter is 16 as the example, the step A1 to the step A8 may particularly be implemented as follows:

Firstly, it is determined that the speed parameter 16 is in the first vehicle-speed fuzzy subset [15,20], the first speed end value is 15, and the second speed end value is 20; and the first-end-value proportionality coefficient KP corresponding to the first speed end value 15 is 27, the first-end-value differential coefficient KD does not exist, the firstend-value proportionality coefficient KP corresponding to the second speed end value 20 is 24, and the second-end-value differential coefficient KD does not exist.

Therefore, further, the first proportionality coefficient may be determined by using the weighted-average method.

Particularly:
it may be determined that the first membership coefficient k1 is: (20−16)/(20−15), from which 0.8 is obtained;
it may be determined that the second membership coefficient k2 is: (16−15)/(20−15), from which 0.2 is obtained; and
in turn, it is determined that the outputted first proportionality coefficient KP is: (0.8*27+0.2*24)/(0.8+0.2), from which 26.4 is obtained.

In the example, because the first-end-value differential coefficient and the second-end-value differential coefficient do not exist, it is determined that the first differential coefficient does not exist, and the differential controlling is not required. In other examples, it is assumed that the first-end-value differential coefficient and the second-end-value differential coefficient exist, and the first differential coefficient may be determined by using the mode similar to the above determination of the first proportionality coefficient, which is not discussed here further in the embodiments of the present disclosure.

Taking the case in which the output is z0, the end value is zi and the membership function corresponding to the end values is ki as the example, the above process may be expressed by using a formula as:

$$z_0 \frac{\sum_{j=1}^{n} k_i z_i}{\sum_{i=1}^{n} k_i}$$

Figure 13:
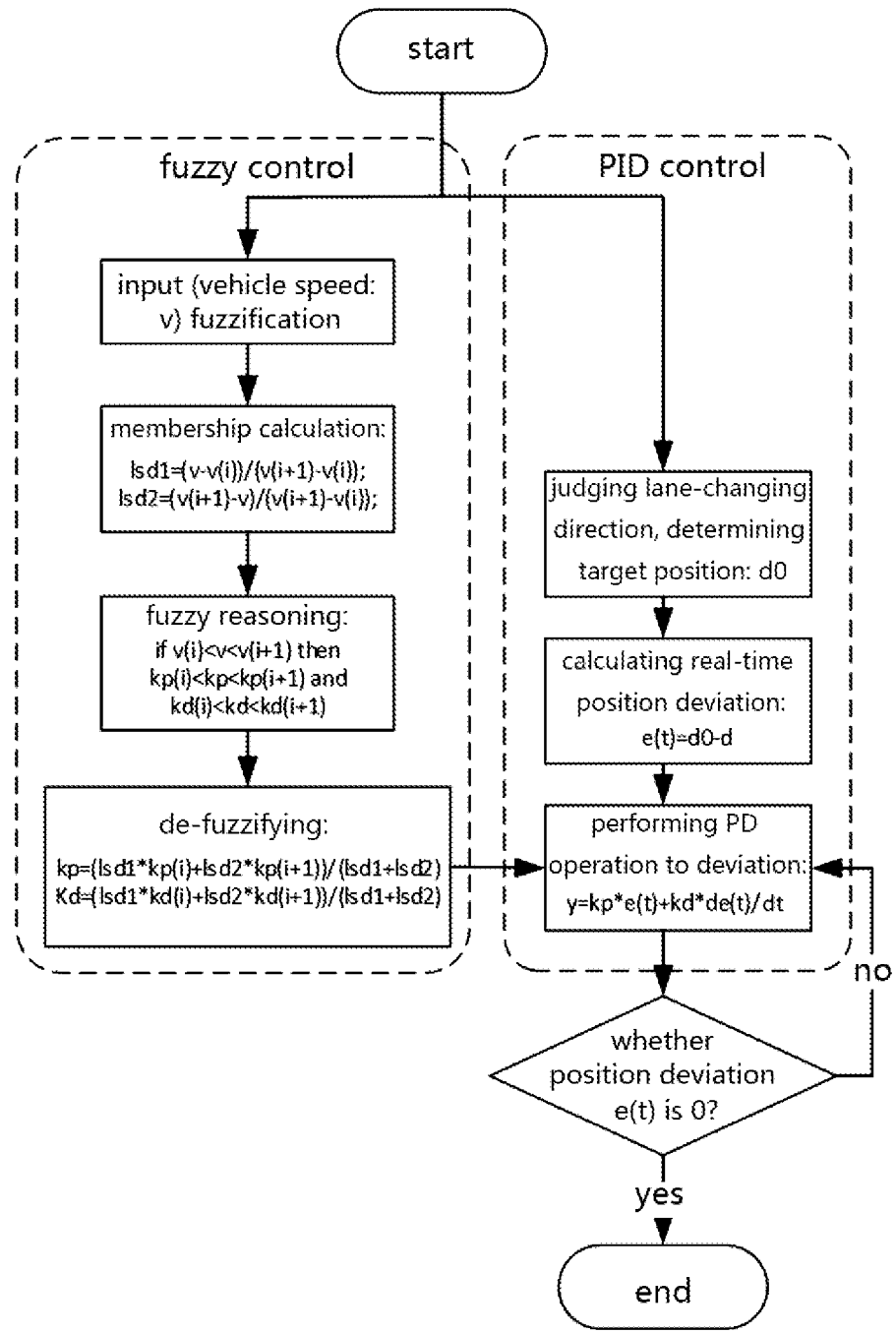
FIG. 13 is a flow chart of the control algorithm for eliminating the position-deviation parameter according to an embodiment of the present disclosure.

In practical applications, the flow chart of the control algorithm for eliminating the position-deviation parameter according to the first proportionality coefficient and the first differential coefficient that are obtained from the first parameter table according to the embodiment of the present disclosure may be shown in FIG. 13.

Step 207: according to a matching relation between the speed parameter and a predetermined second parameter table, determining a second proportionality coefficient that corresponds to the speed parameter.

In an embodiment of the present disclosure, the second proportionality coefficient that is obtained according to the second parameter table may be used to eliminate the heading-angle parameter. As similar to the design concept of the fuzzy-PID controller used to eliminate the position-deviation parameter (transverse position deviation), the PID controller used to eliminate the heading-angle parameter (course deviation) is also required to regulate multiple groups of the PID parameters according to the different vehicle speeds, and automatically regulate the parameters in the actual controlling according to the variation of the vehicle speed. The difference is that the lane-changing controlling does not have a high requirement on the accuracy of the course controlling, so the determination of the PID parameters is performed by the table looking-up and employs the P controlling. The second parameter table may be determined by preliminary test, and may also be acquired from the prior art, which is not particularly limited in the embodiments of the present disclosure.

For example, taking the case in which the second parameter table is Table 2 as the example, the process may comprise, according to the acquired speed parameter, looking up from Table 2 the corresponding approximate or accurate second proportionality coefficient KP.

TABLE 2

| Speed | KP |
|---|---|
| <15 | 8 |
| 15 | 7.5 |
| 20 | 6.5 |
| 25 | 6.3 |
| 30 | 5.8 |
| 35 | 5 |
| 40 | 4.3 |
| 45 | 3.8 |
| 50 | 3.3 |
| 55 | 3 |
| 60 | 2.9 |
| 65 | 2.7 |
| 70 | 2.7 |
| 75 | 2.6 |
| 80 | 2.5 |
| 85 | 2.5 |
| 90 | 2.4 |
| 95 | 2.35 |
| 100 | 2.3 |
| 105 | 2.1 |
| 110 | 2 |
| >115 | 2 |

Figure 14:
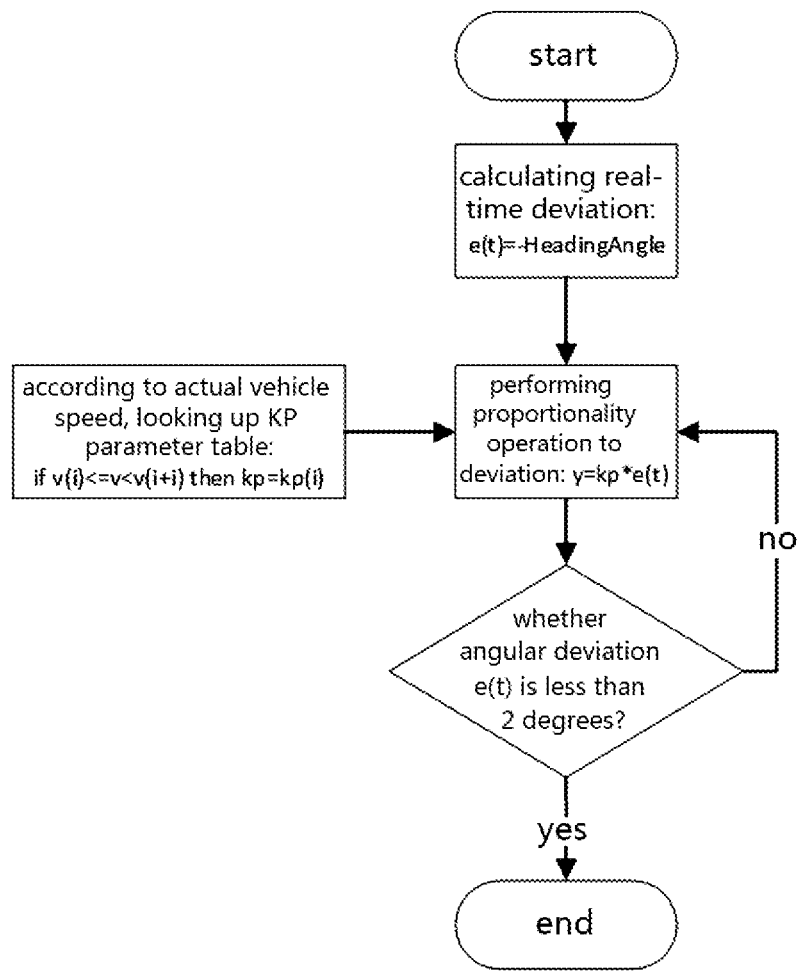
FIG. 14 is a flow chart of the control algorithm for eliminating the heading-angle parameter according to an embodiment of the present disclosure.

In practical applications, the flow chart of the control algorithm for eliminating the heading-angle parameter according to the second proportionality coefficient that is obtained from the second parameter table according to the embodiment of the present disclosure may be shown in FIG. 14.

Step 208: acquiring a position-deviation parameter and a heading-angle parameter of the vehicle, wherein the position-deviation parameter refers to a transverse distance between a current position of the vehicle and the target travelling lane; and the heading angle refers to an included angle between a current course of the vehicle and the target travelling lane.

Step 209: judging whether it has been reached that the position-deviation parameter is less than the first threshold, and the heading-angle parameter is less than the second threshold; if yes, ending; and if no, executing the step 1043 and the step 1044.

Step 210: according to the position-deviation parameter, the first proportionality coefficient and the first differential coefficient, by using a proportional-differential-control algorithm, determining a first steering-wheel steering angle.

Step 211: according to the heading-angle parameter and the second proportionality coefficient, by using a proportional-control algorithm, determining a second steering-wheel steering angle.

Step 212: according to a predetermined rule, calculating on the first steering-wheel steering angle and the second steering-wheel steering angle, to obtain the target steering-wheel steering angle.

In particular applications, taking the case in which the vehicle has an onboard camera as the example, the real-time travelling condition of the vehicle may be determined by using the onboard camera. The position-deviation parameter of the vehicle may be determined by using the difference between the transverse position of the vehicle and the target transverse position of the target travelling lane. The step 208 to the step 212 may be implemented by using the following mode:

The determination of the transverse position of the vehicle: the transverse position of the vehicle may be obtained by the onboard camera detecting the lane line, and the controller fits the curve and outputs in the form of a cubic polynomial, wherein the formula is expressed as follows:

Left-side lane line: left_$y$=left_$c3*x^3$+left_$c2*x^2$+ left_$c1*x$+left_$c0$ Right-side lane line: right_$y$=right_$c3*x^3$+ right_$c2*x^2$+right_$c1*x$+right_$c0$ According to the definition of the polynomial, when the vehicle is in the present lane: transverse position=lane width/2−left_$c0$, or transverse position=right_$c0$−lane width/2

After the vehicle has entered a neighboring lane: transverse position=3*lane width/2−left_$c0$, or transverse position=right_$c0$+lane width/2

The heading-angle parameter (HeadingAngle) may be read in the onboard camera as arctan(left_$c1$) or arctan (right_$c0$).

The determination of the target transverse position: leftward lane changing: the width of one lane (the width of one standard lane is 3.75 m); and rightward lane changing: the negative value of the width of one lane.

Deviation calculation: position-deviation parameter=target transverse position−real-time transverse position The heading-angle parameter=−HeadingAngle The acquiring of the PID parameters: the PID-controller parameters used to eliminate the deviation of the transverse position: acquired by using the first parameter table; and the PID-controller parameters used to eliminate the course deviation: acquired by using the second parameter table.

PID operation: PD operation on the deviation of the transverse position: $y1=kp*e(t)+kd*de(t)/dt$ P operation on the course deviation: $y2=kp*e(t)$ The target controlled quantity: target steering-wheel steering angle=$y1+y2$ Preferably, the output of the target steering-angle may also be processed: for example, limitation on the change rate: the upper limit and the lower limit are determined according to the maximum EPS response rate;

determination of the limitation on the maximum and minimum values: determined according to the extreme values of the steering angle of the steering mechanism of the vehicle; and first-order hysteretic filtering: the filtering coefficient is determined according to the response-lag duration of the executing mechanism.

Figure 15:
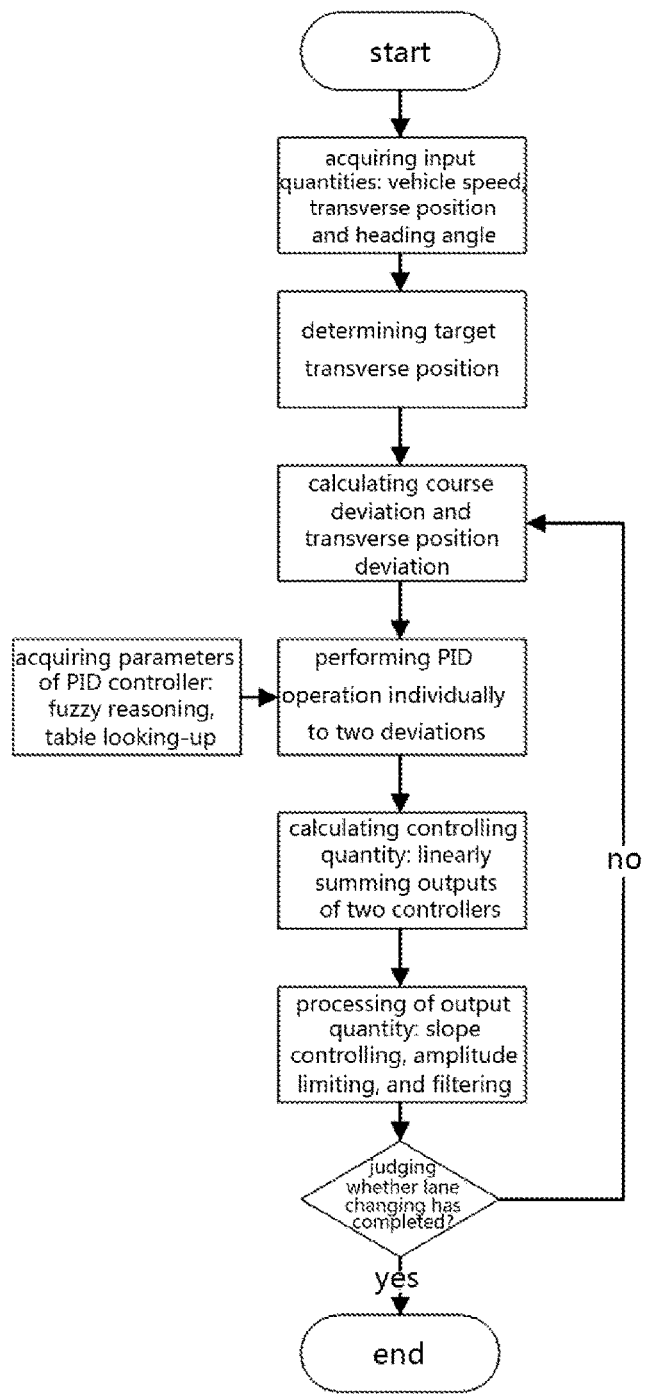
FIG. 15 is a schematic diagram of the particular process of the lane changing according to an embodiment of the present disclosure.

The above process may be expressed by using FIG. 15. The present technical solution has been tested and verified in real cars for hundreds of times, in which the robustness and the comfortableness of the controlling are very good. Furthermore, the algorithms that are designed by using PID control have a high operation efficiency in the controller, which can reduce the load of the CPU.

As a preferable solution of the embodiments of the present disclosure, One implementation of the step 210 is: according to a preset time duration, a predetermined configuration law and the position-deviation parameter, determining components of the position-deviation parameter at time moments within the preset time duration; and according to the first proportionality coefficient, the first differential coefficient and the components of the position-deviation parameter at the time moments, by using the proportional-differential-control algorithm, determining first steering-wheel steering angles at the time moments. At this point, the implementation of the step 212 is: according to the predetermined rule, calculating on the first steering-wheel steering angles at the time moments and the second steering-wheel steering angle, to obtain target steering-wheel steering angles at the time moments.

In particular applications, in the lane changing operation, because, initially, the distance from the vehicle to the target travelling lane is large and the position-deviation parameter is large, if the position-deviation parameter is directly used as the input to the controller, that will results in that, at the start of the lane changing, the vehicle acquires a large target steering-wheel steering angle, which makes the vehicle unstable. In order to eliminate the instability, in an embodiment of the present disclosure, after the position-deviation parameter has been acquired, the process comprises, according to a preset time duration, a predetermined configuration law and the position-deviation parameter, determining components of the position-deviation parameter at time moments within the preset time duration; and then, according to the first proportionality coefficient, the first differential coefficient and the components of the position-deviation parameter at the time moments, by using the proportional-differential-control algorithm, determining first steering-wheel steering angles at the time moments. In other words, firstly the position-deviation parameter is divided by time, wherein the division may be continuous or discontinuous, which is not particularly limited in the embodiments of the present disclosure. Then, the first steering-wheel steering angles at the time points are obtained. Then, subsequently, the vehicle may be controlled to change lane gradually according to the target steering-wheel steering angles at the time points, to maintain the stability during the lane-changing process of the vehicle.

In conclusion, in the method for controlling lane changing of a vehicle according to the embodiments of the present disclosure, after the lane changing instruction has been received, according to the speed parameter of the vehicle, the transverse position distance between the vehicle and the target travelling lane and the included angle between the course of the vehicle and the target travelling lane, the lane-changing controlling can be realized by using the controller. Particularly, after the lane changing instruction has been received, firstly the control parameter of the predetermined controller is determined according to the speed parameter, then the predetermined controller, according to the two variables, the position-deviation parameter and the heading-angle parameter of the vehicle, determines the target steering-wheel steering angle of the vehicle, and the vehicle may be controlled to perform the lane changing operation by using the target steering-wheel steering angle. The position-deviation parameter and the heading-angle parameter are continuously acquired, to perform the lane changing operation, till the position-deviation parameter is less than the first threshold, and the heading-angle parameter is less than the second threshold, when it can be considered that the vehicle is in the target travelling lane, and is travelling along the target travelling lane; in other words, the lane changing of the vehicle has been completed. The embodiments of the present disclosure, by using the speed parameter, the position-deviation parameter and the heading angle, control the vehicle to change lane and determine whether the lane changing has completed, wherein the speed parameter, the position-deviation parameter and the heading angle can be acquired by using a speed sensor and an onboard camera, and do not require to rely on a high-accuracy locating system, which can greatly reduce the cost of the vehicle lane changing and the occupation of the resource of the controller.

Figure 16:
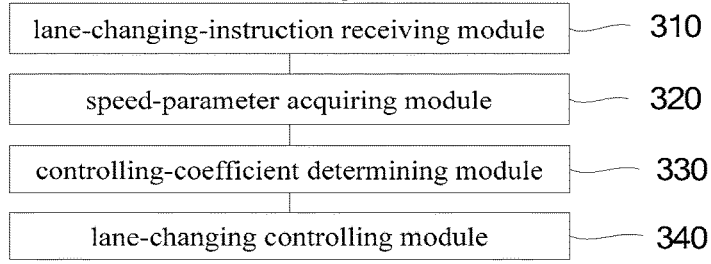
FIG. 16 is a structural block diagram of the device for controlling lane changing of a vehicle according to an embodiment of the present disclosure.

As shown in FIG. 16, FIG. 16 shows a structural block diagram of the device for controlling lane changing of a vehicle according to an embodiment of the present disclosure. The device particularly comprises:

a lane-changing-instruction receiving module 310 configured for receiving a lane changing instruction, wherein the lane changing instruction contains a target travelling lane;

a speed-parameter acquiring module 320 configured for acquiring a speed parameter of the vehicle;

a controlling-coefficient determining module 330 configured for, according to the speed parameter, determining a controlling coefficient of a predetermined controller; and a lane-changing controlling module 340 configured for acquiring a position-deviation parameter and a heading-angle parameter of the vehicle; if the position-deviation parameter is greater than or equal to a first threshold, or, if the heading-angle parameter is greater than or equal to a second threshold, according to the controlling coefficient, the position-deviation parameter and the heading-angle parameter, determining a target steering-wheel steering angle of the vehicle; and according to the target steering-wheel steering angle, controlling the vehicle to perform a lane changing operation, till the position-deviation parameter is less than the first threshold, and the heading-angle parameter is less than the second threshold; wherein the position-deviation parameter refers to a transverse distance between a current position of the vehicle and the target travelling lane; and the heading angle refers to an included angle between a current course of the vehicle and the target travelling lane.

Figure 17:
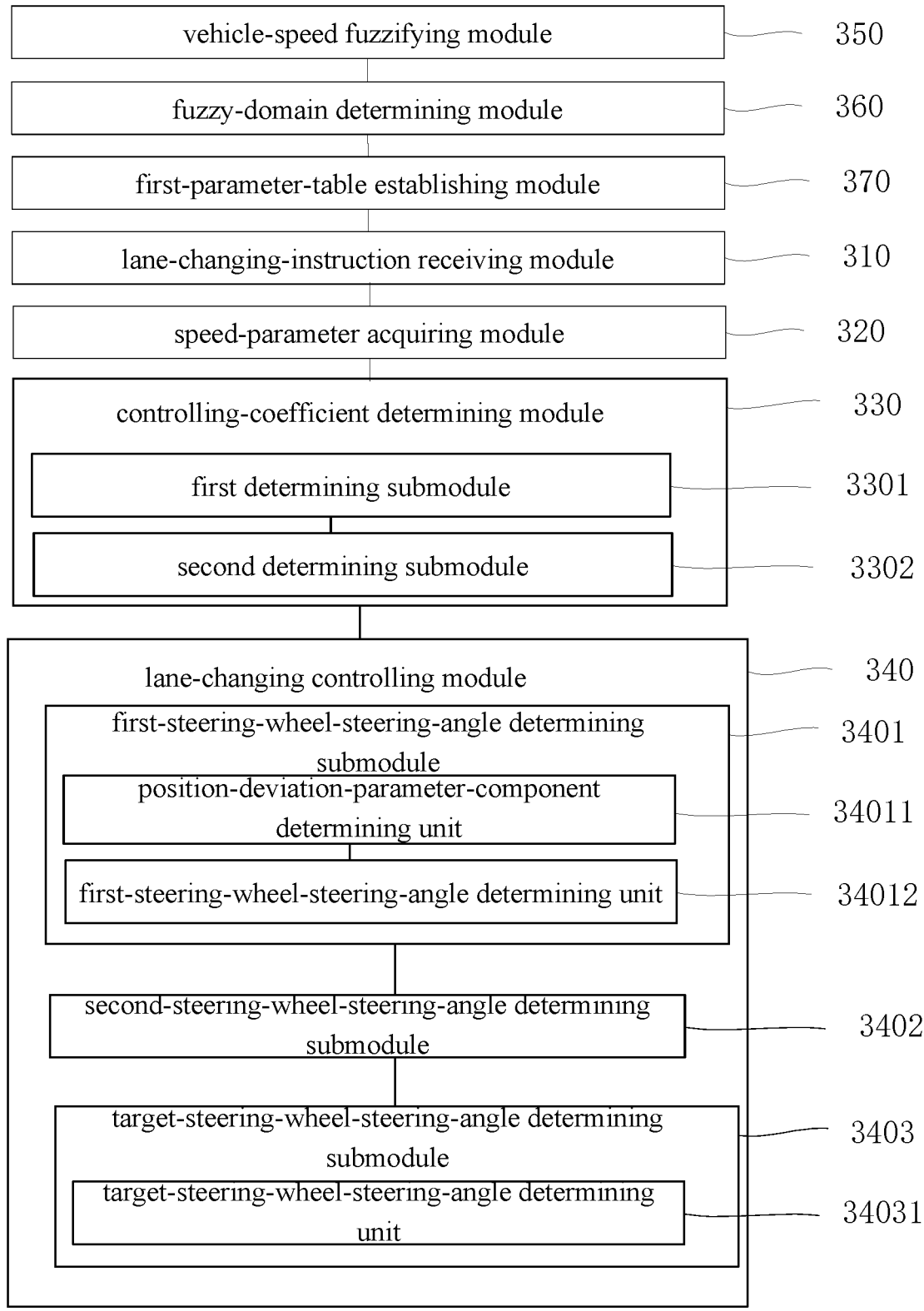
FIG. 17 is a particular structural block diagram of the device for controlling lane changing of a vehicle according to an embodiment of the present disclosure.

As shown in FIG. 17, FIG. 17 shows a particular structural block diagram of the device for controlling lane changing of a vehicle according to an embodiment of the present disclosure. On the basis of FIG. 16, in the device:

The controlling-coefficient determining module 330 comprises:

a first determining submodule 3301 configured for, according to a matching relation between the speed parameter and a predetermined first parameter table, determining a first proportionality coefficient and a first differential coefficient that correspond to the speed parameter; and a second determining submodule 3302 configured for, according to a matching relation between the speed parameter and a predetermined second parameter table, determining a second proportionality coefficient that corresponds to the speed parameter; and the lane-changing controlling module 340 comprises:

a first-steering-wheel-steering-angle determining submodule 3401 configured for, according to the position-deviation parameter, the first proportionality coefficient and the first differential coefficient, by using a proportional-differential-control algorithm, determining a first steering-wheel steering angle;

a second-steering-wheel-steering-angle determining submodule 3402 configured for, according to the heading-angle parameter and the second proportionality coefficient, by using a proportional-control algorithm, determining a second steering-wheel steering angle; and a target-steering-wheel-steering-angle determining submodule 3403 configured for, according to a predetermined rule, calculating on the first steering-wheel steering angle and the second steering-wheel steering angle, to obtain the target steering-wheel steering angle.

The device further comprises:

a vehicle-speed fuzzifying module 350 configured for fuzzifying a preset vehicle speed, to obtain a fuzzy domain of the preset vehicle speed, wherein the fuzzy domain of the preset vehicle speed contains: vehicle-speed fuzzy subsets and a vehicle-speed membership function;

a fuzzy-domain determining module 360 configured for, according to the vehicle-speed fuzzy subsets and the vehicle-speed membership function, determining a fuzzy domain of proportionality coefficients and a fuzzy domain of differential coefficients at different preset vehicle speeds, wherein the fuzzy domain of the proportionality coefficients contains: proportionality-coefficient fuzzy subsets and a proportionality-coefficient membership function; and the fuzzy domain of the differential coefficients contains: differential-coefficient fuzzy subsets and a differential-coefficient membership function; and a first-parameter-table establishing module 370 configured for, according to a correspondence relation between the vehicle-speed fuzzy subsets, the vehicle-speed membership function, the proportionality-coefficient fuzzy subsets, the proportionality-coefficient membership function, the differential-coefficient fuzzy subsets and the differential-coefficient membership function, establishing the first parameter table.

The first-steering-wheel-steering-angle determining submodule 3401 comprises:

a position-deviation-parameter-component determining unit 34011 configured for, according to a preset time duration, a predetermined configuration law and the position-deviation parameter, determining components of the position-deviation parameter at time moments within the preset time duration; and a first-steering-wheel-steering-angle determining unit 34012 configured for, according to the first proportionality coefficient, the first differential coefficient and the components of the position-deviation parameter at the time moments, by using the proportional-differential-control algorithm, determining first steering-wheel steering angles at the time moments; and the target-steering-wheel-steering-angle determining submodule 3403 comprises:

a target-steering-wheel-steering-angle determining unit 34031 configured for, according to the predetermined rule, calculating on the first steering-wheel steering angles at the time moments and the second steering-wheel steering angle, to obtain target steering-wheel steering angles at the time moments.

A vehicle, wherein the vehicle comprises the device for controlling lane changing of a vehicle of any one of the above items.

In the embodiments of the present disclosure, after the lane changing instruction has been received, according to the speed parameter of the vehicle, the transverse position distance between the vehicle and the target travelling lane and the included angle between the course of the vehicle and the target travelling lane, the lane-changing controlling can be realized by using the controller. Particularly, after the lane changing instruction has been received, firstly the control parameter of the predetermined controller is determined according to the speed parameter, then the predetermined controller, according to the two variables, the position-deviation parameter and the heading-angle parameter of the vehicle, determines the target steering-wheel steering angle of the vehicle, and the vehicle may be controlled to perform the lane changing operation by using the target steering-wheel steering angle. The position-deviation parameter and the heading-angle parameter are continuously acquired, to perform the lane changing operation, till the position-deviation parameter is less than the first threshold, and the heading-angle parameter is less than the second threshold, when it can be considered that the vehicle is in the target travelling lane, and is travelling along the target travelling lane; in other words, the lane changing of the vehicle has been completed. The embodiments of the present disclosure, by using the speed parameter, the position-deviation parameter and the heading angle, control the vehicle to change lane and determine whether the lane changing has completed, wherein the speed parameter, the position-deviation parameter and the heading angle can be acquired by using a speed sensor and an onboard camera, and do not require to rely on a high-accuracy locating system, which can greatly reduce the cost of the vehicle lane changing and the occupation of the resource of the controller.

A person skilled in the art can clearly understand that, in order for the convenience and concision of the description, the particular working processes of the above-described systems, devices and units may refer to the corresponding processes according to the above-described process embodiments, and are not discussed here further.

The above description is merely preferable embodiments of the present disclosure, and is not indented to limit the present disclosure. Any modifications, equivalent substitutions and improvements that are made within the spirit and the principle of the present disclosure should fall within the protection scope of the present disclosure.

The above-described device embodiments are merely illustrative, wherein the units that are described as separate components may or may not be physically separate, and the components that are displayed as units may or may not be physical units; in other words, they may be located at the same one location, and may also be distributed to a plurality of network units. Part or all of the modules may be selected according to the actual demands to realize the purposes of the solutions of the embodiments. A person skilled in the art can understand and implement the technical solutions without paying creative work.

Each component embodiment of the present disclosure may be implemented by hardware, or by software modules that are operated on one or more processors, or by a combination thereof. A person skilled in the art should understand that some or all of the functions of some or all of the components of the calculating and processing device according to the embodiments of the present disclosure may be implemented by using a microprocessor or a digital signal processor (DSP) in practice. The present disclosure may also be implemented as apparatus or device programs (for example, computer programs and computer program products) for implementing part of or the whole of the method described herein. Such programs for implementing the present disclosure may be stored in a computer-readable medium, or may be in the form of one or more signals. Such signals may be downloaded from an Internet website, or provided on a carrier signal, or provided in any other forms.

Figure 18:
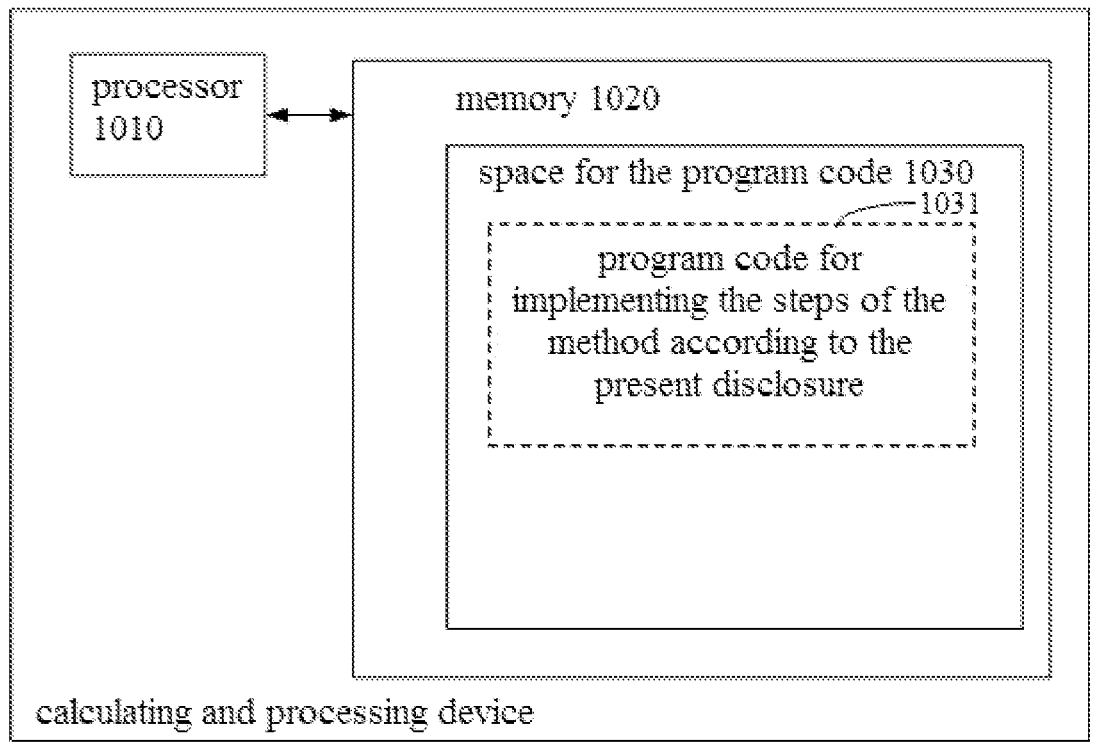
FIG. 18 schematically shows a block diagram of a calculating and processing device for implementing the method according to the present disclosure.
Figure 19:
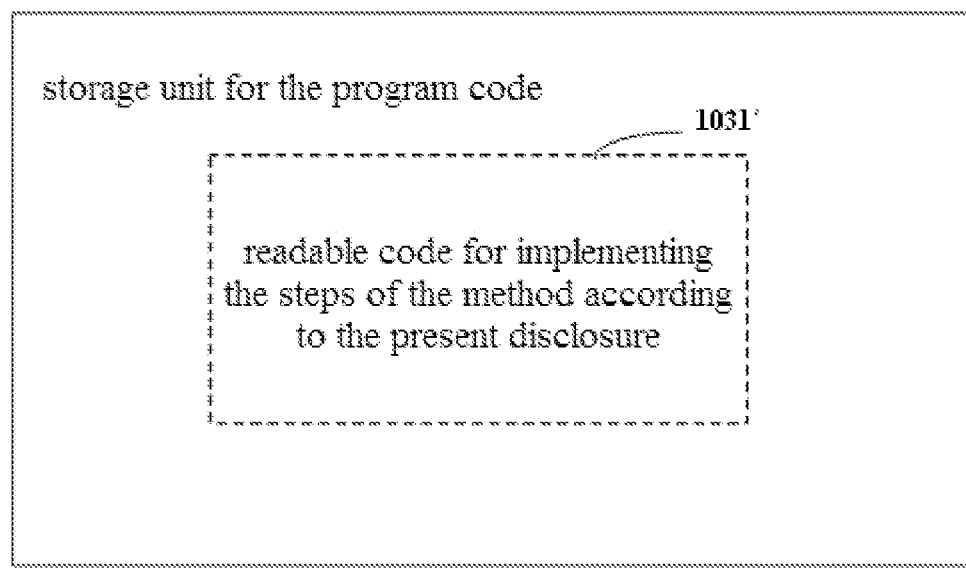
FIG. 19 schematically shows a storage unit for maintaining or carrying a program code of implementing the method according to the present disclosure.

For example, FIG. 18 shows a calculating and processing device that can implement the method according to the present disclosure. The calculating and processing device traditionally comprises a processor 1010 and a computer program product or computer-readable medium in the form of a memory 1020. The memory 1020 may be electronic memories such as flash memory, EEPROM (Electrically Erasable Programmable Read Only Memory), EPROM, hard disk or ROM. The memory 1020 has the storage space 1030 of the program code 1031 for implementing any steps of the above method. For example, the storage space 1031 for program code may contain program codes 1031 for individually implementing each of the steps of the above method. Those program codes may be read from one or more computer program products or be written into the one or more computer program products. Those computer program products include program code carriers such as hard disk, compact disk (CD), memory card or floppy disk as shown in FIG. 19. Such computer program products are usually portable or fixed storage units. The storage unit may have storage segments or storage spaces with similar arrangement to the memory 1020 of the calculating and processing device in FIG. 18. The program codes may for example be compressed in a suitable form. Generally, the storage unit contains a computer-readable code 1031', which can be read by a processor like 1010. When those codes are executed by the calculating and processing device, the codes cause the calculating and processing device to implement each of the steps of the method described above.

The "one embodiment", "an embodiment" or "one or more embodiments" as used herein means that particular features, structures or characteristics described with reference to an embodiment are included in at least one embodiment of the present disclosure. Moreover, it should be noted that here an example using the wording "in an embodiment" does not necessarily refer to the same one embodiment.

The description provided herein describes many concrete details. However, it can be understood that the embodiments of the present disclosure may be implemented without those concrete details. In some of the embodiments, well-known processes, structures and techniques are not described in detail, so as not to affect the understanding of the description.

In the claims, any reference signs between parentheses should not be construed as limiting the claims. The word "comprise" does not exclude elements or steps that are not listed in the claims. The word "a" or "an" preceding an element does not exclude the existing of a plurality of such elements. The present disclosure may be implemented by means of hardware comprising several different elements and by means of a properly programmed computer. In unit claims that list several devices, some of those devices may be embodied by the same item of hardware. The words first, second, third and so on do not denote any order. Those words may be interpreted as names.

Finally, it should be noted that the above embodiments are merely intended to explain the technical solutions of the present disclosure, and not to limit them. Although the present disclosure is explained in detail by referring to the above embodiments, a person skilled in the art should understand that he can still modify the technical solutions set forth by the above embodiments, or make equivalent substitutions to part of the technical features of them. However, those modifications or substitutions do not make the essence of the corresponding technical solutions depart from the spirit and scope of the technical solutions of the embodiments of the present disclosure.

The invention claimed is:

1. A method for controlling lane changing of a vehicle, wherein the method comprises:

receiving a lane changing instruction, wherein the lane changing instruction contains a target travelling lane;
acquiring a speed parameter of the vehicle;
according to the speed parameter, determining a controlling coefficient of a predetermined controller, and the predetermined controller is a proportion integration differentiation (PID) controller;
lane-changing controlling, comprising: acquiring a position-deviation parameter and a heading-angle parameter of the vehicle; when at least one of conditions that the position-deviation parameter is greater than or equal to a first threshold, and the heading-angle parameter is greater than or equal to a second threshold occurs, according to the controlling coefficient, the position-deviation parameter and the heading-angle parameter, determining a target steering-wheel steering angle of the vehicle; and according to the target steering-wheel steering angle, controlling the vehicle to perform a lane changing operation; and
repeating the step of lane-changing controlling, till the position-deviation parameter is less than the first threshold, and the heading-angle parameter is less than the second threshold;
wherein the position-deviation parameter refers to a transverse distance between a current position of the vehicle and a target position within the target travelling lane; and the heading angle refers to an included angle between a current course of the vehicle and the target travelling lane;
wherein the step of, according to the speed parameter, determining the controlling coefficient of the predetermined controller comprises:
according to a matching relation between the speed parameter and a predetermined first parameter table, determining a first proportionality coefficient and a first differential coefficient that correspond to the speed parameter; and
according to a matching relation between the speed parameter and a predetermined second parameter table, determining a second proportionality coefficient that corresponds to the speed parameter; and
the step of, according to the controlling coefficient, the position-deviation parameter and the heading-angle parameter, determining the target steering-wheel steering angle of the vehicle comprises:
according to the position-deviation parameter, the first proportionality coefficient and the first differential coefficient, by using a proportional-differential-control algorithm, determining a first steering-wheel steering angle;
according to the heading-angle parameter and the second proportionality coefficient, by using a proportional-control algorithm, determining a second steering-wheel steering angle; and
according to a predetermined rule, calculating on the first steering-wheel steering angle and the second steering-wheel steering angle, to obtain the target steering-wheel steering angle.

2. The method according to claim 1, wherein before the step of, according to the speed parameter, determining the controlling coefficient of the predetermined controller, the method further comprises:
fuzzifying a preset vehicle speed, to obtain a fuzzy domain of the preset vehicle speed, wherein the fuzzy domain of the preset vehicle speed contains: vehicle-speed fuzzy subsets and a vehicle-speed membership function;
according to the vehicle-speed fuzzy subsets and the vehicle-speed membership function, determining a fuzzy domain of proportionality coefficients and a fuzzy domain of differential coefficients at different preset vehicle speeds, wherein the fuzzy domain of the proportionality coefficients contains: proportionality-coefficient fuzzy subsets and a proportionality-coefficient membership function; and the fuzzy domain of the differential coefficients contains: differential-coefficient fuzzy subsets and a differential-coefficient membership function; and
according to a correspondence relation between the vehicle-speed fuzzy subsets, the vehicle-speed membership function, the proportionality-coefficient fuzzy subsets, the proportionality-coefficient membership function, the differential-coefficient fuzzy subsets and the differential-coefficient membership function, establishing the first parameter table.

3. The method according to claim 2, wherein the step of, according to the matching relation between the speed parameter and the predetermined first parameter table, determining the first proportionality coefficient and the first differential coefficient that correspond to the speed parameter comprises:
determining a first vehicle-speed fuzzy subset that matches with the speed parameter;
determining a first speed end value and a second speed end value of the first vehicle-speed fuzzy subset;
determining a first-end-value proportionality coefficient and a first-end-value differential coefficient in the first parameter table that correspond to the first speed end value;
determining a second-end-value proportionality coefficient and a second-end-value differential coefficient in the first parameter table that correspond to the second speed end value;
determining a first membership coefficient, comprising: dividing a difference between the first speed end value and the speed parameter by a difference between the second speed end value and the first speed end value, to determine the first membership coefficient;
determining a second membership coefficient, comprising: dividing a difference between the second speed end value and the speed parameter by the difference between the second speed end value and the first speed end value, to determine the second membership coefficient;
determining the first proportionality coefficient, comprising: dividing a sum of a product between the first membership coefficient and the first-end-value proportionality coefficient and a product between the second membership coefficient and the second-end-value proportionality coefficient by a sum of the first membership coefficient and the second membership coefficient, to determine the first proportionality coefficient; and
determining the first differential coefficient, comprising: dividing a sum of a product between the first membership coefficient and the first-end-value differential coefficient and a product between the second membership coefficient and the second-end-value differential coefficient by a sum of the first membership coefficient and the second membership coefficient, to determine the first differential coefficient.

4. The method according to claim 1, wherein the step of, according to the position-deviation parameter, the first proportionality coefficient and the first differential coefficient, by using the proportional-differential-control algorithm, determining the first steering-wheel steering angle comprises:
  according to a preset time duration, a predetermined configuration law and the position-deviation parameter, determining components of the position-deviation parameter at time moments within the preset time duration; and
  according to the first proportionality coefficient, the first differential coefficient and the components of the position-deviation parameter at the time moments, by using the proportional-differential-control algorithm, determining first steering-wheel steering angles at the time moments; and
  the step of, according to the predetermined rule, calculating on the first steering-wheel steering angle and the second steering-wheel steering angle, to obtain the target steering-wheel steering angle comprises:
  according to the predetermined rule, calculating on the first steering-wheel steering angles at the time moments and the second steering-wheel steering angle, to obtain target steering-wheel steering angles at the time moments.

5. A calculating and processing device for controlling lane changing of a vehicle, wherein the calculating and processing device comprises a processor and a memory, wherein the memory stores a program code for implementing the operations of:
  receiving a lane changing instruction, wherein the lane changing instruction contains a target travelling lane;
  acquiring a speed parameter of the vehicle;
  according to the speed parameter, determining a controlling coefficient of a predetermined controller, and the predetermined controller is a proportion integration differentiation (PID) controller; and
  a lane changing controlling operation, comprising acquiring a position-deviation parameter and a heading-angle parameter of the vehicle; when at least one of conditions that the position-deviation parameter is greater than or equal to a first threshold, and the heading-angle parameter is greater than or equal to a second threshold occurs, according to the controlling coefficient, the position-deviation parameter and the heading-angle parameter, determining a target steering-wheel steering angle of the vehicle; and according to the target steering-wheel steering angle, controlling the vehicle to perform a lane changing operation, till the position-deviation parameter is less than the first threshold, and the heading-angle parameter is less than the second threshold; wherein the position-deviation parameter refers to a transverse distance between a current position of the vehicle and a target position within the target travelling lane; and the heading angle refers to an included angle between a current course of the vehicle and the target travelling lane;
  wherein the operation of, according to the speed parameter, determining the controlling coefficient of the predetermined controller comprises:
  according to a matching relation between the speed parameter and a predetermined first parameter table, determining a first proportionality coefficient and a first differential coefficient that correspond to the speed parameter; and
  according to a matching relation between the speed parameter and a predetermined second parameter table, determining a second proportionality coefficient that corresponds to the speed parameter; and wherein the lane changing controlling operation comprises:
  a first-steering-wheel-steering-angle determining operation, comprising: according to the position-deviation parameter, the first proportionality coefficient and the first differential coefficient, by using a proportional-differential-control algorithm, determining a first steering-wheel steering angle;
  a second-steering-wheel-steering-angle determining operation, including: according to the heading-angle parameter and the second proportionality coefficient, by using a proportional-control algorithm, determining a second steering-wheel steering angle; and
  a target-steering-wheel-steering-angle determining operation, including: according to a predetermined rule, calculating on the first steering-wheel steering angle and the second steering-wheel steering angle, to obtain the target steering-wheel steering angle.

6. The calculating and processing device according to claim 5, wherein the memory stores a program code for implementing the operations of:
  fuzzifying a preset vehicle speed, to obtain a fuzzy domain of the preset vehicle speed, wherein the fuzzy domain of the preset vehicle speed contains: vehicle-speed fuzzy subsets and a vehicle-speed membership function;
  according to the vehicle-speed fuzzy subsets and the vehicle-speed membership function, determining a fuzzy domain of proportionality coefficients and a fuzzy domain of differential coefficients at different preset vehicle speeds, wherein the fuzzy domain of the proportionality coefficients contains: proportionality-coefficient fuzzy subsets and a proportionality-coefficient membership function; and the fuzzy domain of the differential coefficients contains: differential-coefficient fuzzy sub sets and a differential-coefficient membership function; and
  according to a correspondence relation between the vehicle-speed fuzzy subsets, the vehicle-speed membership function, the proportionality-coefficient fuzzy subsets, the proportionality-coefficient membership function, the differential-coefficient fuzzy subsets and the differential-coefficient membership function, establishing the first parameter table.

7. The calculating and processing device according to claim 5, wherein the first-steering-wheel-steering-angle determining operation comprises:
  according to a preset time duration, a predetermined configuration law and the position-deviation parameter, determining components of the position-deviation parameter at time moments within the preset time duration; and
  according to the first proportionality coefficient, the first differential coefficient and the components of the position-deviation parameter at the time moments, by using the proportional-differential-control algorithm, determining first steering-wheel steering angles at the time moments.

8. A vehicle, wherein the vehicle comprises the calculating and processing device for controlling lane changing of a vehicle, wherein the calculating and processing device comprises a processor and a memory, wherein the memory stores program code for implementing the operations of:
  receiving a lane changing instruction, wherein the lane changing instruction contains a target travelling lane;
  acquiring a speed parameter of the vehicle;

according to the speed parameter, determining a controlling coefficient of a predetermined controller, and the predetermined controller is a proportion integration differentiation (PID) controller; and a lane changing controlling operation, including acquiring a position-deviation parameter and a heading-angle parameter of the vehicle; when at least one of conditions that the position-deviation parameter is greater than or equal to a first threshold, and the heading-angle parameter is greater than or equal to a second threshold occurs, according to the controlling coefficient, the position-deviation parameter and the heading-angle parameter, determining a target steering-wheel steering angle of the vehicle; and according to the target steering-wheel steering angle, controlling the vehicle to perform a lane changing operation, till the position-deviation parameter is less than the first threshold, and the heading-angle parameter is less than the second threshold; wherein the position-deviation parameter refers to a transverse distance between a current position of the vehicle and a target position within the target travelling lane; and the heading angle refers to an included angle between a current course of the vehicle and the target travelling lane;

wherein the operation of according to the speed parameter, determining a controlling coefficient of a predetermined controller comprises:

according to a matching relation between the speed parameter and a predetermined first parameter table, determining a first proportionality coefficient and a first differential coefficient that correspond to the speed parameter; and according to a matching relation between the speed parameter and a predetermined second parameter table, determining a second proportionality coefficient that corresponds to the speed parameter; and wherein the lane changing controlling operation comprises:

a first-steering-wheel-steering-angle determining operation, including: according to the position-deviation parameter, the first proportionality coefficient and the first differential coefficient, by using a proportional-differential-control algorithm, determining a first steering-wheel steering angle;

a second-steering-wheel-steering-angle determining operation, including: according to the heading-angle parameter and the second proportionality coefficient, by using a proportional-control algorithm, determining a second steering-wheel steering angle; and a target-steering-wheel-steering-angle determining operation, including: according to a predetermined rule, calculating on the first steering-wheel steering angle and the second steering-wheel steering angle, to obtain the target steering-wheel steering angle.

9. The calculating and processing device according to claim 7, wherein the target-steering-wheel-steering-angle determining operation comprises:

according to the predetermined rule, calculating on the first steering-wheel steering angles at the time moments and the second steering-wheel steering angle, to obtain target steering-wheel steering angles at the time moments.

10. The vehicle according to claim 8, wherein the calculating and processing device further comprises:

fuzzifying a preset vehicle speed, to obtain a fuzzy domain of the preset vehicle speed, wherein the fuzzy domain of the preset vehicle speed contains: vehicle-speed fuzzy subsets and a vehicle-speed membership function;

according to the vehicle-speed fuzzy subsets and the vehicle-speed membership function, determining a fuzzy domain of proportionality coefficients and a fuzzy domain of differential coefficients at different preset vehicle speeds, wherein the fuzzy domain of the proportionality coefficients contains: proportionality-coefficient fuzzy subsets and a proportionality-coefficient membership function; and the fuzzy domain of the differential coefficients contains: differential-coefficient fuzzy subsets and a differential-coefficient membership function; and according to a correspondence relation between the vehicle-speed fuzzy subsets, the vehicle-speed membership function, the proportionality-coefficient fuzzy subsets, the proportionality-coefficient membership function, the differential-coefficient fuzzy subsets and the differential-coefficient membership function, establishing the first parameter table.

11. The vehicle according to claim 8, wherein the first-steering-wheel-steering-angle determining operation comprises:

according to a preset time duration, a predetermined configuration law and the position-deviation parameter, determining components of the position-deviation parameter at time moments within the preset time duration; and according to the first proportionality coefficient, the first differential coefficient and the components of the position-deviation parameter at the time moments, by using the proportional-differential-control algorithm, determining first steering-wheel steering angles at the time moments.

12. The vehicle according to claim 11, wherein the target-steering-wheel-steering-angle determining operation comprises:

according to the predetermined rule, calculating on the first steering-wheel steering angles at the time moments and the second steering-wheel steering angle, to obtain target steering-wheel steering angles at the time moments.

* * * * *